United States Patent [19]

Gottliebson

[11] 4,341,983

[45] Jul. 27, 1982

[54] AUTOMATIC SEQUENCE CONTROL SYSTEM

[76] Inventor: Mayo Gottliebson, 419 E. Main St., Lancaster, Ohio 43130

[21] Appl. No.: 168,180

[22] Filed: Jul. 11, 1980

Related U.S. Application Data

[63] Continuation-in-part of Ser. No. 941,324, Sep. 11, 1978, abandoned.

[51] Int. Cl.³ .......................... H02P 1/58; F04B 41/06
[52] U.S. Cl. ................................. 318/102; 318/481; 318/482; 417/7; 417/8
[58] Field of Search ................... 417/6, 7, 8; 318/101, 318/102, 103, 481, 482

[56] References Cited

U.S. PATENT DOCUMENTS

| | | | |
|---|---|---|---|
| 1,357,102 | 10/1920 | Lewis | 417/7 |
| 1,982,578 | 11/1934 | Durdin | 417/7 |
| 2,482,496 | 9/1949 | McGillivray | 318/102 |
| 2,486,256 | 10/1949 | Buck | 417/7 |
| 2,526,646 | 10/1950 | Ericson | 417/7 |
| 2,741,986 | 4/1956 | Smith | 417/6 |
| 2,797,846 | 7/1957 | Reed | 417/7 |
| 2,803,192 | 8/1957 | Crabtree | 417/7 |
| 3,285,181 | 11/1966 | Howard | 318/102 |
| 3,292,547 | 12/1966 | Ward | 318/102 |
| 3,426,259 | 2/1969 | Ziehm | 318/102 |
| 3,741,683 | 6/1973 | McTamaney | 417/7 |
| 3,744,932 | 7/1973 | Prevett | 417/8 |

Primary Examiner—Ulysses Weldon
Attorney, Agent, or Firm—Roger L. Martin

[57] ABSTRACT

An automatic system for controlling a plurality of motors includes motor starting circuitry and motor stopping circuitry that serves to sequentially start and stop the motors in the same cyclic order. The starting circuitry has a sensing component for sensing the presence and absence of a condition that reflects the need for starting the motor and a master starting control component which develops two different states that are used in controlling the circuits of the starting circuitry. The control circuits include a plurality of motor starting circuits for starting the respective motors and a plurality of conditioning circuits that normally respond to one of the developed states for conditioning the starting circuits for response sequentially to the other of the developed states and in a cyclic order for starting the motors. The stopping circuitry has a sensing component for sensing the presence and absence of yet another condition that reflects the need for stopping the motor and a master stopping control component which develops two different states that are used in controlling the circuits of the stopping circuitry. The control circuits of the stopping circuitry include a plurality of motor stopping circuits and stopping circuit conditioning circuits which normally respond to the development of one of the states to condition the starting circuits for sequential response to the development of the other of the states and in the same cyclic order used for starting the motors. Timing circuits are described for sequentially stopping and/or starting the motors when a continuing stop or start demand arises and for causing the sequential response in each of the starting and stopping circuitries.

7 Claims, 8 Drawing Figures

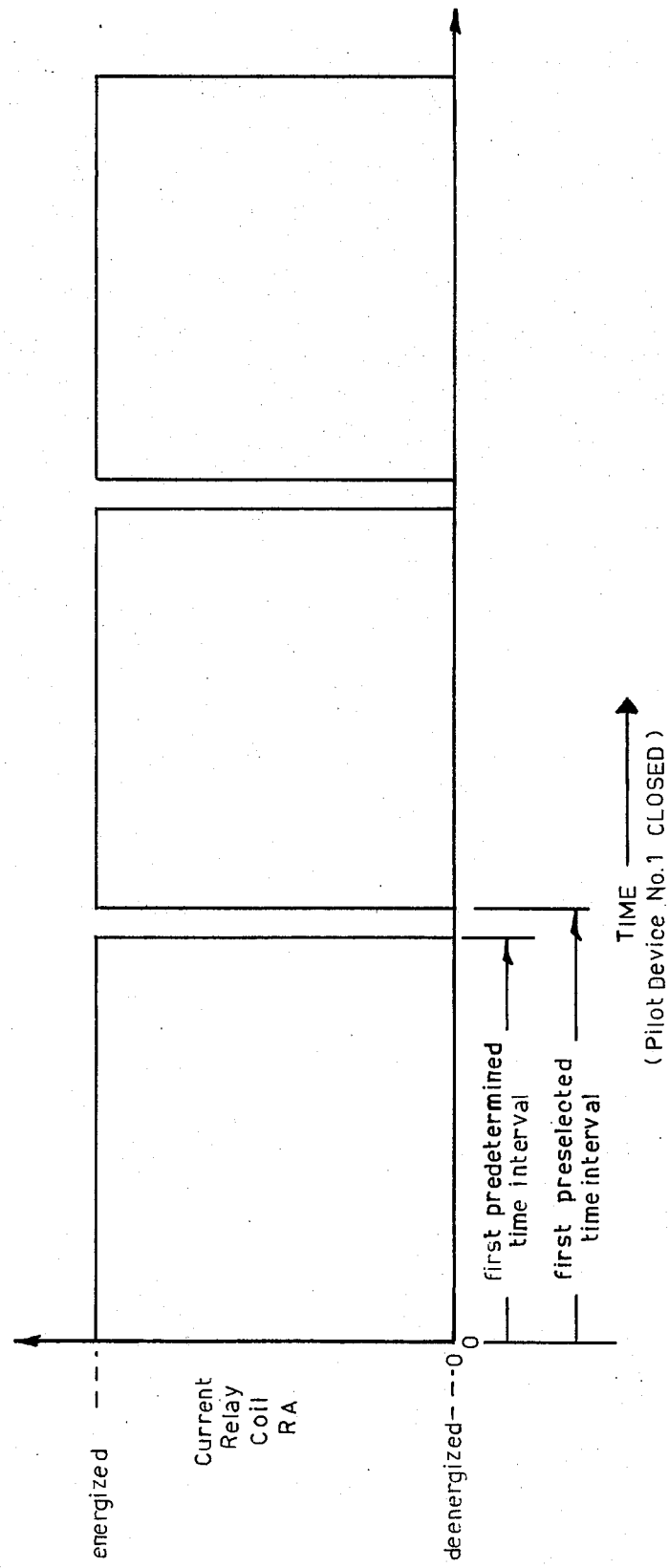

AUTOMATIC SEQUENCE CONTROL SYSTEM

This application is a continuation-in-part of application Ser. No. 941,324, filed Sept. 11, 1978 now abandoned and entitled An Automatic Sequence Control System.

BACKGROUND OF THE INVENTION

This invention relates to systems for automatically controlling the operation of a plurality of motors and, more particularly, to systems for automatically controlling the starting and stopping of a plurality of electric motors.

The main function of a system for automatically controlling the operation of a plurality of motors is to systematically start the motors in accord with the operating demand therefore and to systematically stop the motors as the operating demand diminishes. The useful life of an electric motor diminishes as its operating time accumulates and the life is rapidly shortened by frequent starts with insufficient time between prior stops to permit the cooling of the motor parts. As such, the order that is followed in the starting and stopping of the motors in a control system is important in prolonging the life of each motor.

The ideal system for controlling a plurality of motors would be one which, over a prolonged period of time, subjects all of the controlled motors to an equal number of starts and to an equal amount of operating time, and all while maximizing the time period between successive stops and starts for each motor being controlled. This would serve to prolong the useful life of each motor and would greatly facilitate the establishment and the performance of inspection, repair and maintenance schedules for both the controlled motors and the equipment operated thereby.

Most systems for automatically controlling the operation of a plurality of motors use a motor starting sequence which is based on a predetermined "cyclic" or "repeating" order for systematically and sequentially starting all of the motors being controlled by the system. The starting sequence is changed in such systems in accord with a control cycle that contemplates some recurring event, and this is usually when the first motor rendered operational in accord with the starting sequence is thereafter deenergized.

For example, the five motors required at a peak operating demand on a conventional system for automatically controlling such motors may be identified as motors Nos. 1 through 5 inclusive, and in the order in which they are sequentially energized to fulfill a peak demand when the system is initially rendered operational. The "cyclic" or "repeating" motor order on which the starting sequence is based will then be the repeating sequence of motors Nos. 1 through 5 inclusive, or motor #1, #2, #3, #4, #5, #1, #2, #3, #4, #5, #1, #2, #3, . . . etc. The normal pattern followed in changing the motor starting sequence in accord with the control cycle for such conventional systems is to provide an advance of one motor in the repeating order with each successive change in the starting sequence. As such, in the conventional system contemplated, the initial starting sequence for a peak demand situation would be motor #1, #2, #3, #4 and #5 in that order, and the next or second starting sequence would be motor #2, #3, #4, #5 and #1 in that order. With succeeding control cycles, the starting sequence would accordingly change by advancing one motor number in the repeating order with each successive cycle.

The conventional automatic control systems use a motor stopping sequence which is based on an order that is the reverse of that followed in starting the motors. This simply means that between the changes in the motor starting sequence, and where one or more of the controlled motors has theretofore been energized in accord with the motor starting sequence then governing the operation of the motors, the motor which is stopped in response to a diminishing motor operating demand will be the last motor that was energized in accord with the motor starting sequence then governing the system. Simultaneously, any increased operating demand before the first motor started in accord with the governing starting sequence is deenergized, will be in accord with the starting sequence which is then governing the system.

The conventional control systems are less than satisfactory and this is particularly so in situations where several motors are being controlled and the motor operating demand on the system fluctuates over long periods of time and rarely diminishes below a demand for at least one motor. Under such circumstances, one or more of the controlled motors will be subjected to a far greater amount of wear than others because they are subjected to more frequent starts and stops. For example, in the conventional system for controlling the five motors referred to heretofore, the starting sequence governing the system during the initial control cycle contemplated the systematic and sequential starting of motors #1, #2, #3, #4 and #5 in that order in order to fulfill a peak demand on the system. If the maximum demand imposed on the system when the initial starting sequence was governing the system was only for the operation of three motors, and if the demand fluctuated several times from one to three motors before the starting sequence was changed by the deenergizing of motor #1, then motors #2 and #3 would have been subjected to several starts and stops and the #1 motor would have remained operational throughout the initial cycle. Simultaneously, motors #4 and #5 would have remained inoperative. In many situations the demand for the operation of at least one motor may continue for several months. This, of course, would preclude an opportunity for the starting sequence to be changed if the change is keyed to a deenergizing of the first motor started in the sequence and it would also subject at least some of the other motors to frequent starts and stops in accord with the fluctuating demand and thus to the accelerated wear which arises from such occurrences.

SUMMARY OF THE INVENTION

The invention contemplates a system for automatically controlling the operation of a plurality of motors and where the starting sequence is not only "based on" a predetermined "cyclic" or "repeating" order for systematically and sequentially starting all of the motors being controlled by the system but where, once the system is rendered operational, the starting sequence is at all times "in accord" with the repeating order. This is accomplished by the use of a motor stopping sequence which is in accord with the cyclic order for starting the motors. Consequently, the operational motor which has been running the longest at the time of a decreased motor operating demand is the motor next stopped and the inoperative motor which has been idle the longest at the time of an increased motor operating demand is the motor next started.

The invention features a system for controlling a plurality of motors and involves the use of means for sensing the presence and absence of each of two conditions that have been determined to respectively establish the need for starting and stopping at least one of the motors. In a preferred embodiment of the invention, as applied to a fluid handling system that has a sump for receiving a fluid in amounts which vary during any time period and also has a plurality of motor driven pumps for withdrawing the received fluid, a pressure sensor is used to sense the presence and absence of a sump fluid level at or above an upper liquid level that has been determined to establish the need for starting at least one pump motor. In addition to the upper liquid level sensor, yet another pressure sensor is used in this embodiment to sense the presence and absence of a sump liquid level at or below a lower liquid level that has been determined to establish the need for stopping at least one of the pump motors.

The motors controlling system contemplates a circuitry for starting the motors sequentially and in accord with a predetermined repeating or cyclic order, as well as circuitry for sequentially stopping the motors in accord with the same cyclic or repeating order. The starting circuitry has a master starting control circuit for developing appropriate signals or states that reflect the presence and absence of the sensed start condition and it also has a plurality of starting circuits and conditioning circuits that operate under the control of the master starting control circuit. The starting circuits are associated with the respective motors and each serves to start its associated motor in response to a start signal or state that is developed by the master starting control circuit. The conditioning circuits are also associated with the respective motors and they serve to condition the respective starting circuits for sequential response to successive start signal developments by the master starting control circuit and all to the end that each motor is only started once during a control cycle for the system and then only in the order contemplated by the cyclic or repeating starting order.

The stopping circuitry also has a master control circuit. This circuit, however, serves to develop appropriate signals or states that reflect the presence and absence of the sensed stop condition. In addition to the master control circuit, the stopping circuitry also includes a plurality of stopping circuits and a plurality of stopping circuit conditioning circuits which operate under the control of the master stopping control circuit. The stopping circuits are associated with the respective motors and serve to stop the motors in response to stop signals or states that are developed by the master stopping control circuit. The conditioning circuits are also associated with the respective motors and here serve to condition the respective motor control stopping circuits for response sequentially to successive developments of the stop signal by the master control circuit, and again all to the end that each motor is stopped in the same order it was started.

The control of the starting and stopping circuits during continuous operation of the motors controlling system is such that the motor deenergized for the longest period of time will be the next motor to be started while the motor energized for the longest period of time will be the next motor deenergized. This basically causes a change in the motor starting sequence each time a motor is deenergized and precludes a situation where but one motor is turned on and off to satisfy a fluctuating demand that continues over a long period of time.

The conditioning circuits of the starting and stopping circuitry respond to developed signals or states that reflect an absence of a sensed start and stop condition. As such, and in accord with certain aspects of the invention, provisions are made in each of the master control circuits for developing such signals as are indicative of an absence of the condition for a limited time interval after the development of the start or stop signal for a predetermined time period during a prolonged sensed presence of the start or stop condition as the case may be. This permits more than one motor to be energized without a sensed absence of the start condition as when the start condition is continually sensed for a prolonged period that would indicate the inability of the motor added at the commencement of the prolonged period to accomplish the job. It also permits more than one motor to be deenergized without a sensed absence of the stop condition, as when the presence of the stopped condition is being continuously sensed for a prolonged period that is indicative of excess motor capacity.

A general object of the invention is to provide an improved automatic motor control system. A further object of the invention is to provide an improved motor control system for automatically controlling the operating number, and the starting and stopping sequence of a plurality of electrically powered pump motors. A still further object of the invention is to provide an improved motor control system which controls motors in the starting and stopping of the motors in accord with a predetermined cyclic or repeating motor order and wherein at any point in time during a control cycle the motor which has been energized the longest is the next motor that will be stopped and the motor which has been deenergized the longest will be the next motor that will be energized. A prime object of the invention is to provide an improved motors control system which regulates the starting and stopping of the motors in a manner that distribute the wear equally among the individual motors of the system.

The foregoing and various other objects, features and advantages of the invention will become more apparent and understandable as the description proceeds hereinbelow, with reference taken to the accompanying drawings which illustrate, by way of example, only some preferred embodiments of the invention and in which like reference characters denote the corresponding parts of the several circuits.

BRIEF DESCRIPTION OF THE DRAWINGS

FIG. 2 shows the manner in which FIGS. 2a and 2b are interconnected;

FIGS. 4a and 4b are a simplified, logic block diagram equivalent of the relay embodiment of FIG. 2 without the pilot devices, their associated relays and all their contacts shown, and FIG. 4 shows the manner in which FIGS. 4a and 4b are interconnected.

DETAILED DESCRIPTION

Figure 1:
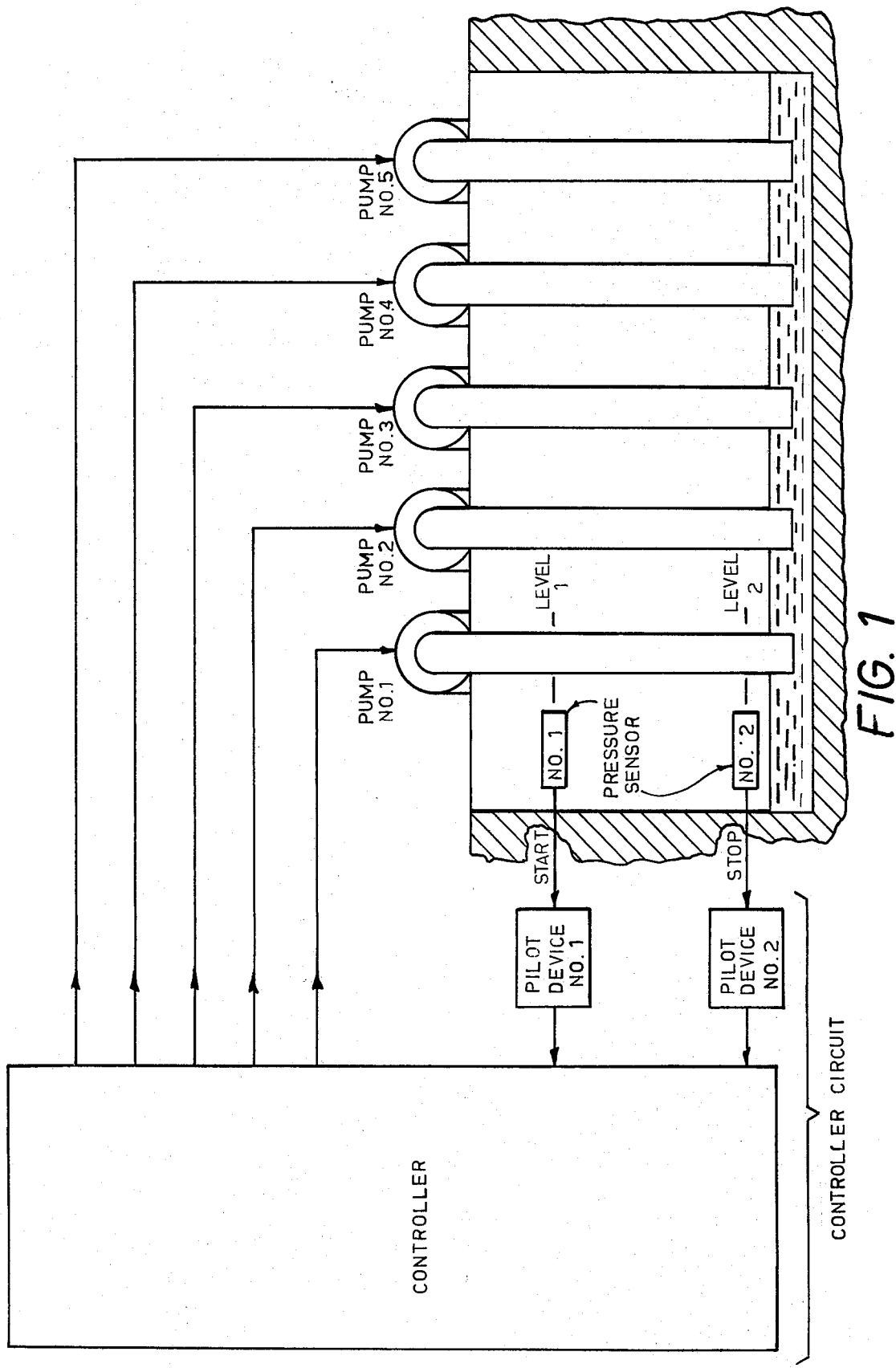
FIG. 1 is a simplified functional block diagram circuit of the controller circuit embodying the present invention and having five, electric motor driven pumps used to remove liquid from a diagrammatically shown common sump.

With particular reference to FIG. 1 and which is a simplified functional diagram that illustrates a system for controlling a plurality of pump motors in a system that is designed to remove fluid from a sump, the motors controlling system is seen as including a controller circuit and a pair of pressure sensors that are strategically located in the sump to sense the presence and absence of two separate conditions that respectively reflect the need for more and less pumping capacity.

The motors controlling system includes motor starting circuitry that comprises pressure sensor No. 1 and pilot device No. 1, and it also includes motor stopping circuitry that comprises pressure sensor No. 2 and pilot device No. 2. The starting circuitry serves to sequentially start the motors in accord with a predetermined cyclic or repeating order, as will be more apparent subsequently, and it has a master starting control circuit for developing appropriate control signals or states which reflect the presence and absence of a need for more pumping capacity and are used to control other circuits of the starting circuitry. Pressure sensor No. 1 is a component of the master starting control circuit and is arranged at an upper or high level, Level 1, in the sump to sense the presence and absence of the condition that calls for the starting of a pump motor, namely the high fluid levels sump condition at which the sump fluid level is at or above Level 1. Pilot device No. 1 is also a component of the master starting control circuit in the embodiment illustrated and the response of pressure sensor No. 1 is fed (FIG. 1) to and controls the operation of a circuit making and breaking switch of pilot device No. 1.

The stopping circuitry serves to sequentially stop the motors in the same cyclic or repeating order in which they are controlled to start. The circuitry includes a master stopping control circuit for developing appropriate signals or states which reflect the presence and absence of a need for less pumping capacity and are used to control certain other circuits of the stopping circuitry. Pressure sensor No. 2 is a component of the master stopping control circuit and is arranged at an appropriate low level, Level 2, in the sump to sense the presence and absence of the condition calling for the stopping of a pump motor, namely the low fluid levels sump condition where the sump fluid level is at or below Level 2. Pilot device No. 2 is also a component of the master stopping control circuit in the illustrated embodiment and the response of the pressure sensor is set, as seen in FIG. 1, to the pilot device No. 2 for controlling a circuit making and breaking switch component thereof.

As will be subsequently seen, the master starting control circuit has a master control relay or component that develops energized and deenergized states in response to the sensed presence and absence of the motor start or high sump fluid level condition at Level 1. The starting circuits for starting the motors are designed in the starting circuitry to normally respond to energized state developements by the master control component and the circuits for conditioning the starting circuits to sequentially respond to successive energized developments are designed to normally respond to the intervening deenergized state developments. Accordingly, it will be appreciated that under the circumstances where the start condition is being sensed for a prolonged period and thus indicating a continuing demand for additional pumping capacity, the need arises to interrupt the energized state in order to condition the starting circuits for the addition of further pumping capcity. As will be seen, this is accomplished, in the embodiment described herein, through the use of a timing device which interrupts the energized state of the master control relay for a limited time interval after it has been energized for a predetermined time period so that the circuit conditioning function can be carried out during the interval and the next motor started as the energized state is thereafter redeveloped.

The master stopping control circuit also has a master stopping control relay or component. In this instance, the relay develops energized and de-energized states in response to the sensed presence and absence of the master stop or low sump level condition at Level 2. In the stopping circuitry, the stopping circuits respond to the energized state developments of the master control relay and their conditioning circuits respond to the deenergized state developments. As such, the need also arises to interrupt the energized state when the stopped condition is being continuously sensed for a prolonged period that indicates a continuing demand for less pumping capacity. This is accomplished once again with a timing device which in this case interrupts the energized state of the master stopping control relay component for a limited time interval after the relay has been energized for a predetermined time period so that the circuit conditioning function can be carried out during the de-energized interval and before the next motor is stopped in response to the energized state thereafter developed.

In practice, if no pumps are initially operating and the sump liquid level rises and remains above Level 1, all five pump motors will be sequentially energized under the control of the master starting control circuit and in the order contemplated by the cyclic order. Now, if the last pump motor energized provides sufficient pumping capacity to progressively lower the sump fluid level to a level below Level 2, and if one assumes that the delivery of fluid to the sump ceases as the fluid level falls below Level 2, then the fluid level will remain below the Level 2 and the low level stop condition will be sensed for a prolonged period. Under such circumstances, the master stopping control circuit will operate to sequentially stop the motors in the same order in which they were started with the first pump motor started being the first motor stopped.

Figures 2, 4, 4B:
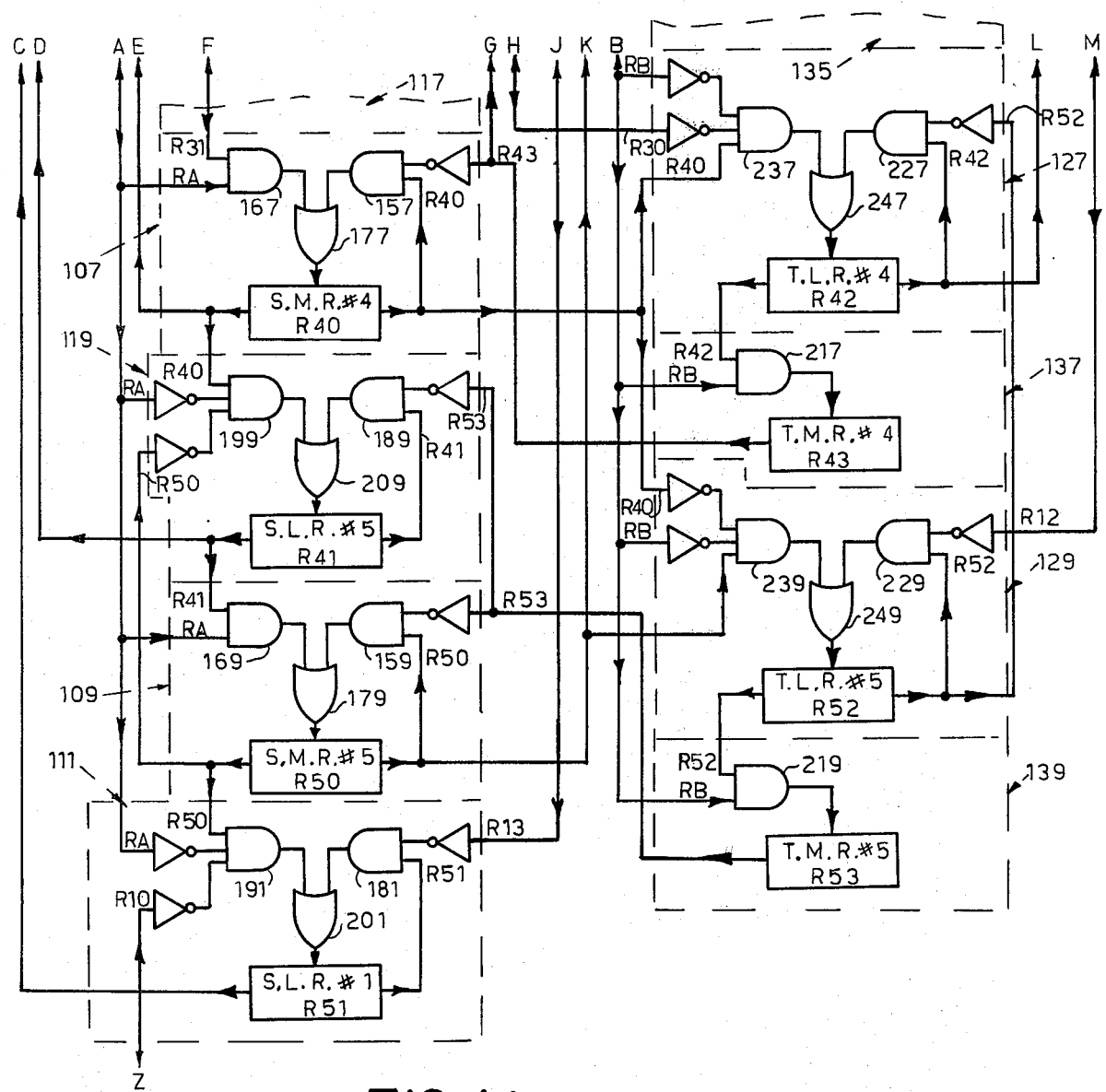
Figure 2A:
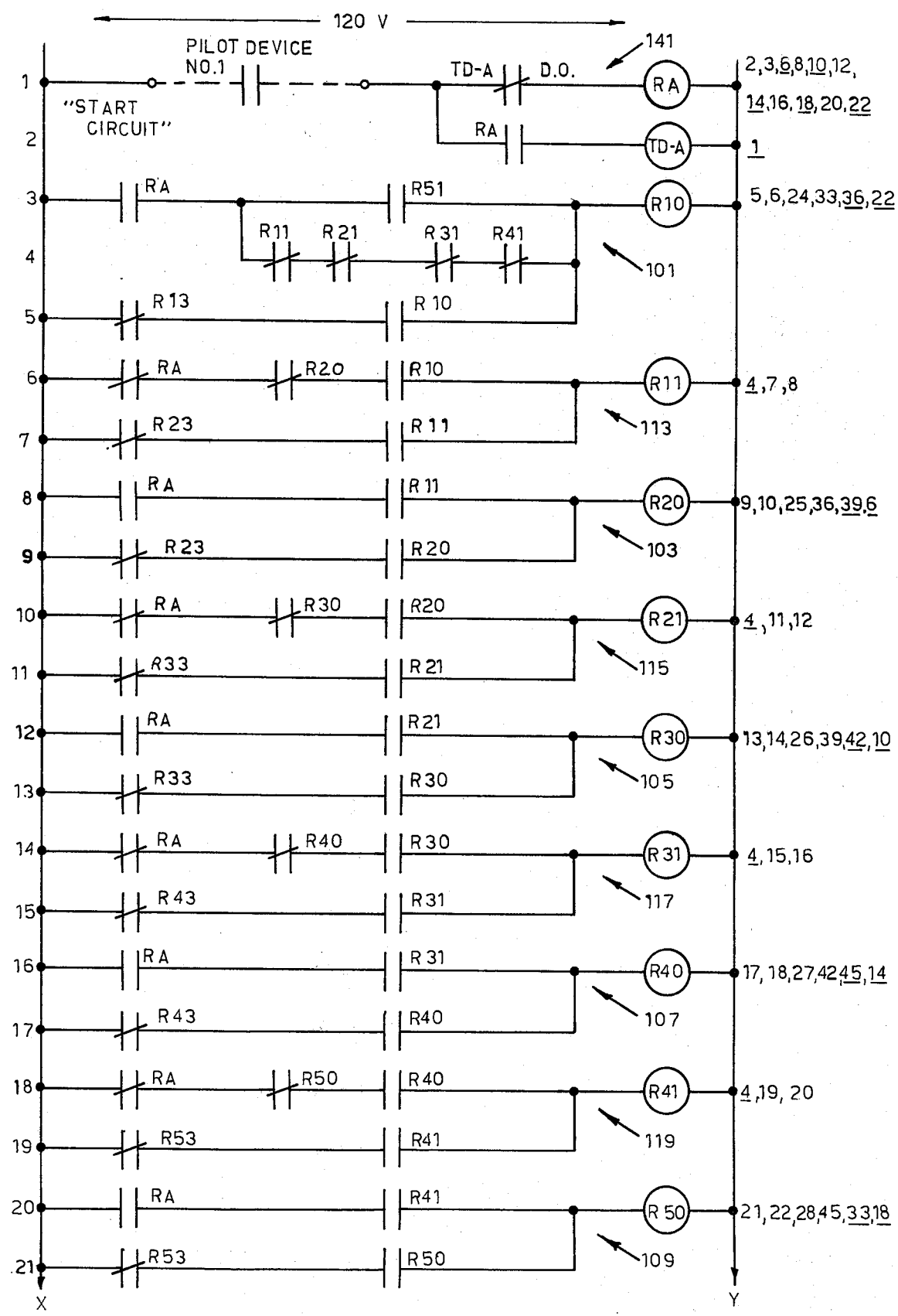
FIGS. 2a and 2b are schematic diagrams of a relay embodiment of the controller circuit of FIG. 1.
Figure 2B:
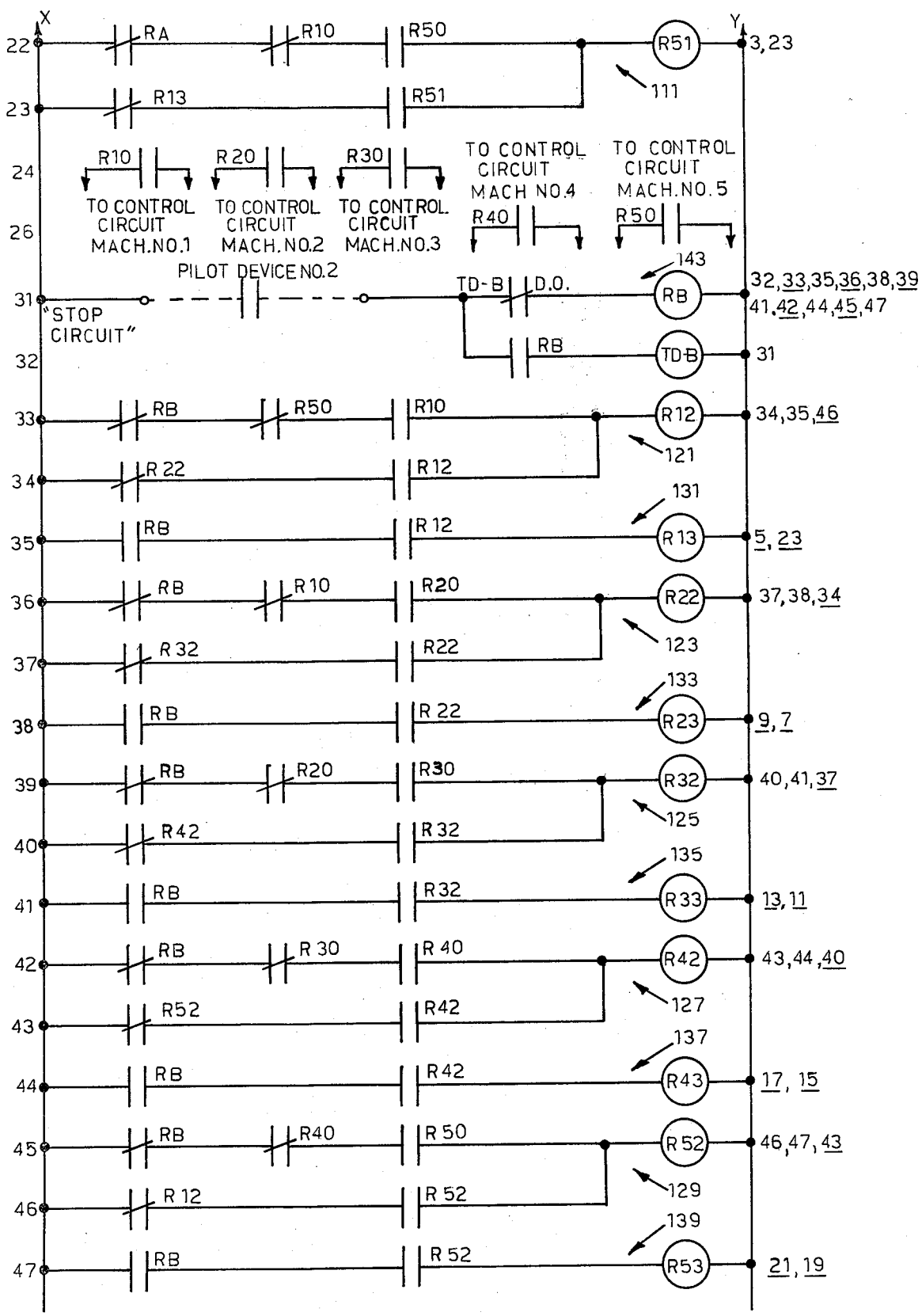
Figure 4A:
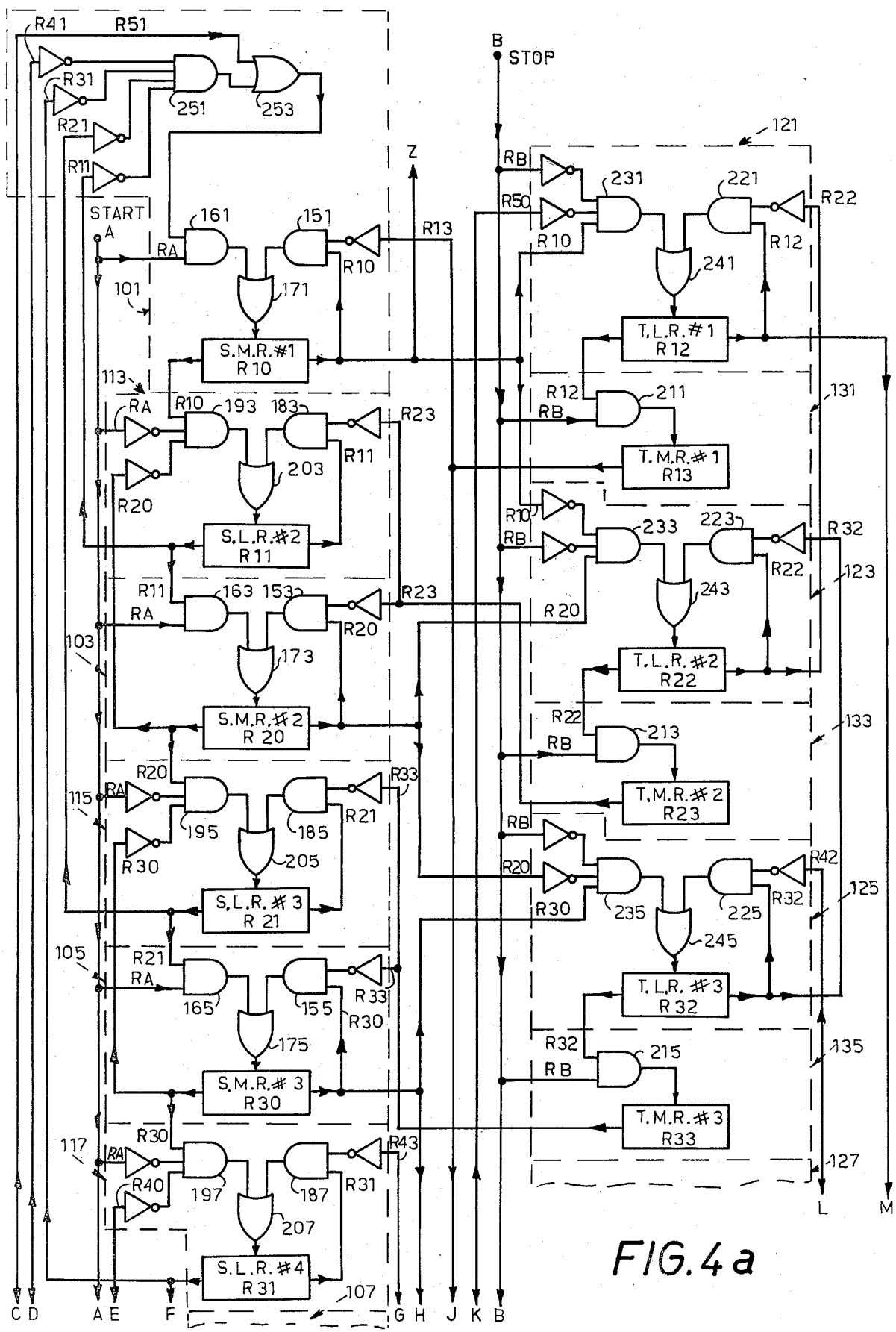

Reference is now made to the schematics of FIG. 2 and which generally illustrates the preferred embodiment through the use of a ladder type circuit arrangement in which the circuits are energized by a 120 volt a.c. supply. The numbers at the left of the ladder arrangement are line numbers and the arrangement includes relays which are illustrated as circles in the lines. The numbers at the right of the relays indicate the lines in which the relay switches are found. If the switch is open when the relay is de-energized, the line number for the switch is not underlined. On the other hand, if the switch is closed when the relay is de-energized, then the line number is underlined in the drawing.

The motors starting circuitry includes a plurality of motor control starting circuits which are associated with the respective motors and generally designated at 101, 103, 105, 107 and 109 in FIG. 2. These starting circuits are for starting the respective motors and are equipped with respective starting relays R10, R20, R30, R40 and R50, as seen in Lines 3, 8, 12, 16 and 20. Each starting circuit includes a pair of parallel branch circuits that are connected in series with the relay of the starting circuit as seen in the drawings. Starting circuit 101 is associated with machine or motor No. 1 and comprises a first parallel response branch circuit for energizing relay R10 in Line 3 and which includes series connected, normally opened relay switch RA and normally opened relay switch R51 in Line 3, and a shunt circuit around relay switch R51 that in Line 4 includes series connected, normally closed relay switches R11, R21, R31, and R41. The function of this shunt circuit will be explained subsequently. The second parallel branch circuit of the No. 1 motor starting circuit 101 operates in response to R10 and serves to maintain the energized condition of the relay R10 and includes series connected, normally closed relay switch R13 and relay switch R10 in Line 5. Starting circuit 103 is associated with machine or motor No. 2 and comprises a first parallel response branch circuit for energizing relay R20 in Line 8 and which, in Line 8, includes series connected, normally opened relay switches RA and R11 and a second parallel branch sealing or latching circuit which responds when relay R20 is energized and serves to maintain its energized condition, and which, in Line 9, includes series connected, normally closed relay switch R23 and normally opened relay switch R20. Starting circuit 105 is associated with machine or motor No. 3 and comprises a first parallel response branch circuit for energizing relay R30 in Line 12. The response branch includes series connected, normally opened relay switches RA and R21 in Line 21. The No. 3 starting circuit 105 also includes a second parallel branch latching circuit which responds when relay R30 in Line 12 is energized and serves to maintain its energized condition. The response branch in Line 13 includes series connected, normally closed relay switch R33 and normally opened relay switch R30. The starting circuit 107 is associated with motor or machine No. 4 and comprises a first parallel response branch circuit for energizing relay R40 in Line 16. The response branch here includes series connected, normally opened relay switches RA and R31 in Line 16 and which respond when relay R40 in Line 16 is energized and serves to maintain its energized condition. This latching branch circuit in Line 17 includes series connected, normally closed relay switch R43 and normally opened relay switch R40. Starting circuit 109 is associated with machine or motor No. 5 and comprises a first parallel branch response circuit for energizing relay R50 in Line 20 and this response branch includes series connected, normally opened relay switches RA and R51 in Line 20. The second parallel branch circuit is a latching circuit which responds when relay R50 in Line 20 is energized and serves to maintain the energized condition of the relay. It includes series connected, normally closed relay switch R53 and normally opened relay switch R50 in Line 21.

The starting circuitry also includes a plurality of starting circuit conditioning circuits which are associated with the respective motors for conditioning the respective starting circuits to respond sequentially to successive developments of the start signals or states by the master starting control circuit. These conditioning circuits are designated at 111, 113, 115, 117 and 119 respectively and are equipped with respective starting circuit conditioning relays R51, R11, R21, R31 and R41 as seen in Lines 22, 6, 10, 14 and 18. Each conditioning circuit includes a pair of parallel branch circuits that are connected in series with the starting circuit conditioning relay of the conditioning circuit. Conditioning circuit 111 is associated with machine or motor No. 1 and serves during the continuous operation of the motors controlling system to condition the No. 1 motor starting circuit 101 for response to an energized state development by the master control relay RA in Line 1. It comprises a first parallel response branch circuit for energizing the relay R51 in Line 22 and which includes series connected, normally closed relay switches RA and R10 and normally opened relay switch R50 in Line 22. This No. 1 motor starting conditioning circuit also comprises a second parallel latching branch circuit which responds when relay R51 in Line 22 is energized to maintain its energized condition and includes series connected, normally closed relay switch R13 and normally opened relay switch R51 in Line 23. The conditioning circuit 113 is associated with machine or motor No. 2 and serves to condition the No. 2 motor starting circuit 103 for response to an energized state development by the master control relay RA in Line 1. It includes a first parallel response branch circuit for energizing relay R11 in Line 6 and which comprises series connected, normally closed relay switch RA and switch R20 and normally opened relay switch R10 in Line 6. The circuits 113 also includes a second parallel latching branch circuit that responds when relay R11 in Line 6 is energized to maintain the energized condition of the relay and comprises series connected, normally closed relay switch R23 and normally opened relay switch R11 in Line 7. The conditioning circuit 115 is associated with machine or motor No. 3 and serves to condition its starting circuit 105 for response to an energized state development by the master control relay RA in Line 1. It includes a first parallel response branch circuit for energizing relay R21 in Line 10 and which comprises series connected, normally closed relay switches RA and R30 and normally opened relay switch R20 in Line 10. This No. 3 starting circuit conditioning circuit 115 also includes a second parallel latching branch circuit that responds when relay R21 is energized to maintain the energized condition of the relay. It comprises series connected, normally closed relay switch R33 and normally opened relay switch R21 in Line 11. Conditioning circuit 117 is associated with machine or motor No. 4 and serves to condition its starting circuit 107 for response to an energized state development by the master control relay in Line 1. It includes a first parallel branch circuit for energizing relay R31 in Line 14 and which comprises series connected, normally closed switches RA and R40 and normally opened relay switch R30 in Line 14. Circuit 115 also has a second parallel latching branch circuit that responds when relay R31 in Line 14 is energized to maintain the energized condition of the relay. It comprises series connected relay switch R43 and normally opened relay switch R31 in Line 15. Conditioning circuit 119 is associated with machine or motor No. 5 and serves to condition its starting circuit 107 for response to an energized state development by the master control relay in Line 1. It includes a first parallel branch circuit for energizing relay R41 in Line 18 and which comprises series connected, normally closed relay switches RA and R50 and normally opened relay switch R50 in Line 18. The circuit 119 also has a second parallel latching branch circuit which responds when relay R41 in Line 18 is energized to maintain its energized condition and comprises series connected, normally closed relay switch R53 and normally opened relay switch R41 in Line 19.

The motor stopping circuitry includes a plurality of motor control stopping circuits for stopping the respective motors and which are designated at 131, 133, 135, 137 and 139. The stopping circuitry also includes a plurality of stopping circuit conditioning circuits 121, 123, 125, 127 and 129 for conditioning the stopping circuits to sequentially respond to successive stop signals or states that are developed by the master control relay RB of the stopping circuitry.

The stopping circuits 131, 133, 135, 137 and 139 have respective relays R13 in Line 35, R23 in Line 38, R33 in Line 41, R43 in Line 44, and R53 in Line 47 that are energized to disable the starting circuits and conditioning circuits of the motors that are associated with the stopping circuits. Stopping circuit 131 is associated with machine or motor No. 1 and includes the series circuit in Line 35 that comprises normally opened relay switches RA and R12 and relay R31. When relay R13 in Line 35 is energized, it opens the relay switches R13 in Line 5 and 23 to de-energize the No. 1 motor starting relay R10 in Line 3 and its starting circuit conditioning relay in Line 22. Stopping circuit 133 is associated with machine or motor No. 2 and includes the series circuit in Line 38 that comprises normally opened relay switches RB and R22 and relay R23. When relay R23 in Line 38 is energized, it opens its relay switches R23 in Lines 9 and 7 to de-energize the No. 2 motor starting relay R20 in Line 8 and the No. 2 motor starting circuit conditioning relay R11 in Line 6. Stopping circuit 135 is associated with motor No. 3 and includes the series circuit in Line 41 that comprises normally opened relay switches RB and R32 and Relay R33. When the No. 3 motor relay R33 in Line 41 is energized, it opens its relay switches R33 in Lines 13 and 11 to de-energize the No. 3 motor starting relay R30 in Line 12 and its conditioning relay R21 in Line 10. Stopping circuit 137 is associated with motor No. 4 and includes the series circuit in Line 44 that comprises normally opened relay switches RB and R42 and relay R43. When relay R43 in Line 44 is energized, it opens its switches R23 in Lines 17 and 15 to de-energize the No. 4 motor starting relay R40 in Line 16 and the No. 4 motor starting circuit conditioning relay R31 in Line 14. Stopping circuit 139 is associated with motor No. 5 and includes the series circuit in Line 47 that comprises normally opened relay switches RB and R52. When the No. 5 motor stopping relay R53 in Line 47 is energized, it opens the relay switches R53 in Lines 21 and 19 to de-energize the No. 5 motor starting relay R50 in Line 20 and its conditioning relay R41 in Line 18.

The stopping circuit conditioning circuits 121, 123, 125, 127 and 129 have respective relays R12 in Line 33, R22 in Line 36, R32 in Line 39, R42 in Line 42 and R52 in Line 45 and which are sequentially energized to condition their associated stopping circuits for response to successive developments of an energized state by the master control relay RB in Line 31. Each conditioning circuit also has a pair of branch circuits that are arranged in parallel with each other and in series with the conditioning relay circuit. Conditioning circuit 121 is associated with motor No. 1 and its stopping circuit 131, and serves to condition the stopping circuit 131 for response to an energized state development by the master control relay RB in Line 3. It has a first branch response circuit for energizing relay R12 and which includes series connected, normally closed relay switches RB and R50 and normally opned relay switch R30 in Line 33. The second branch circuit of the conditioning circuit 121 responds when relay R12 in Line 33 is energized and serves as a latching circuit to maintain the relays energized condition. It includes the series connected, normally closed relay switch R22 and normally opened relay switch R12 in Line 34. Conditioning circuit 123 is associated with motor No. 2 and its stopping circuit, and serves to condition the stopping circuit 133 for response to an energized state development by master stopping control relay RB in Line 3. Circuit 123 has a first branch response circuit for energizing relay R22 in Line 36 and which includes series connected, normally closed relay switches RB and R10 and normally opened relay switch R20 in Line 36. The second branch circuit of the conditioning circuit 123 again serves as a latching circuit and responds when relay R22 in Line 36 is energized to maintain its energized condition. It includes series connected, normally closed relay switch R32 and normally opened relay switch R22 in Line 37. Conditioning circuit 125 is associated with Motor No. 3 and its stopping circuit 135, and serves to condition stopping circuit 135 for response to an energized state development by master control relay RB in Line 3. Circuit 125 has a first branch circuit for energizing relay R32 in Line 39 and which comprises series connected, normally closed relay switches RB and R20 and normally opened relay switch R30 in Line 39. The second branch circuit of the conditioning circuit 125 responds when relay R32 in Line 39 is energized and serves as a latching circuit to maintain the relays energized condition. It includes series connected, normally closed relay switch R42 and normally opened relay switch R32 in Line 40. Conditioning circuit 127 is associated with motor No. 4 and stopping circuit 137, and serves to condition the circuit 137 for response to an energized state development by the master control relay RB in Line 3. Circuit 127 has a first parallel response branch circuit for energizing relay R42 in Line 42 and which includes series connected, normally closed relay switches RB and R30 and normally opened relay switch R40 in Line 42. The second parallel branch circuit of the conditioning circuit 127 responds when relay R42 in Line 42 is energized and serves to maintain its energized condition. This latching branch circuit includes series connected, normally closed relay switch R52 and normally opened relay switch R42 in Line 43. Conditioning circuit 129 is associated with motor No. 5 and stopping circuit 139. It serves to condition circuit 139 for response to the development of an energized state by the master control relay RB in Line 3. Circuit 129 has a first parallel response branch circuit for energizing relay R52 in Line 45 and which includes series connected, normally closed relay switches RB and R40 and normally opened relay switch R50 in Line 45. The second parallel latching branch circuit of circuit 129 responds when relay R52 in Line 45 is energized and serves to maintain its energized condition. This branch includes series connected, normally closed relay switch R12 and normally opened relay switch R52 in Line 46.

The master starting control circuit of the starting circuitry for the embodiment shown in FIG. 2 is generally designated at 141. This circuit 141 serves to develop a pair of signals or states in response to the sensed presence and absence of the start or high sump fluid level condition at Level 1. Through the use of a timing device, the circuit 141 is also able to develop these signals or states when the start condition is being sensed for a prolonged period.

Circuit 141 includes the pressure sensor No. 1 which is located at the start level 1, and the pilot device No. 1 which is a conventional switching device that responds to the sensor by closing when the presence of the high fluid sump level condition at level 1 is sensed and otherwise is opened in the absence of the high level condition. Circuit 141 also includes a master starting control relay component RA in Line 1 and the timed delay relay TD-A in Line 2.

The switch of pilot device No. 1 is normally opened when the start condition is absent and is connected in series with a pair of parallel circuits. The first parallel circuit includes the series connected master starting control relay RA and normally closed time delay relay switch TD-A in Line 1. The second parallel circuit includes the series connected time delay relay TD-A and the relay switch RA in Line 2. In operation, the switch in Line 1 of the pilot device No. 1 closes when the presence of the start condition (high sump fluid level at Level 1) is initially sensed. This energizes the coil of the master control relay RA in Line 1 by completing the circuit in Line 1 through the normally closed time delay switch TD-A. When the master control relay RA in Line 1 is energized, it responds and among other things, closes its relay switch RA in Line 2. This completes the second branch circuit in Line 2 and energizes the timing mechanism of the timing delay relay TD-A. This timing mechanism is designed to energize the coil of the time delay relay TD-A in Line 2 and thereby open the time delay relay switch TD-A in Line 1, a predetermined time period after the branch circuit in Line 2 is energized unless the time delay mechanism is reset during the delay period by a response of the pilot device No. 1 to a sensed absence of the start condition and which, of course, would cause the switch of pilot device No. 1 to open and thereby de-energize the master control relay RA of Line 1 and the time delay relay of Line 2.

Where the start condition is continuously sensed for a prolonged period extending the predetermined time period for the time delay relay TD-A of Line 2, the pilot device No. 1 switch in Line 1 remains closed and the coil of the time delay relay TD-A is energized at the end of the predetermined time period to open switch TD-A in Line 1. Because of this, the master control relay RA is Line 1 develops a de-energized state and opens the relay switch RA in Line 2. This opens the second branch circuit of the master starting control circuit 141 to de-energize the relay coil and resets the timing mechanism of the time delay relay TD-A in Line 2. As the coil of the time delay relay TD-A is de-energized, the relay switch TD-A in Line 1 closes to again energize the master control relay RA in Line 1. This again closes relay switch RA in Line 2 and energizes the timing mechanism of time delay relay TD-A in Line 2 so that the process continues to repeat itself until the absence of a start condition is sensed. The time interval between the successive energized states that are developed by the master control relay RA is limited by the time response of the circuit components from the instant in time when the relay switch TD-A in Line 1 opens to develop the de-energized state for the master control relay RA in Line 1 to the instant in time that it again closes to again develop an energized state for the relay RA.

The master stopping control circuit of the stopping circuitry in the embodiment illustrated in FIG. 2 is generally designated at 143. It serves to develop a pair of signals or states in response to the sensed presence and absence of the stop or low sump fluid level condition at Level 2. Through the use of another timing device, the circuit 143 is also able to develop the signals or states as the stop condition is being sensed for a prolonged period.

Circuit 143 includes the pressure sensor No. 2 which is located at the stop level 2 to sense the stopped condition and the pilot device No. 2 which responds to the sensor by closing the presence of the low fluid sump level 2 is sensed and otherwise is opened in the absence of the low level condition. Circuit 143 also includes a master stopping control relay RB in Line 31 and the second time delay relay TD-A found in Line 32.

The switch of pilot device No. 2 is normally opened when the stopping condition is absent and not being sensed and it is connected in series with a pair of parallel branch circuit components of the master stopping control circuit 143. The first parallel circuit includes the series connected master control relay RB and the normally closed time delay relay swtich TD-A in Line 31. The second parallel branch circuit includes the series connected time delay relay TD-B and the relay switch RA in Line 32. In operation, the pilot device No. 2 switch in Line 31 closes when the presence of the stopped condition (low sump fluid level at Level 2) is initially sensed. This energizes the coil of a master control relay RB in Line 31 by completing the circuit in Line 31 through the normally closed time delay switch TD-B in Line 31. When the master control relay RB in Line 31 is energized, it responds and among other things, closes its relay switch RA in Line 32. This completes the second branch circuit in Line 32 and energizes the timing mechanism of the time delay relay TD-B. This mechanism is designed to energize the coil of the time delay relay TD-B in Line 32 and thereby open the time delay switch TD-B in Line 31 a predetermined time period after the branch circuit in Line 32 is energized unless the time delay mechanism is reset during the time delay period by a response of the pilot device No. 2 in Line 31 to a sensed absence of the stop condition. This, of course, would cause the switch of pilot device No. 2 to open and thereby de-energize the master control relay RB in Line 31 and also reset the timing mechanism of the time delay relay RB in Line 32.

When the stopping condition is continuously sensed for a prolonged period of time that exceeds the delay period for the time delay relay TD-B in Line 32, the switch in Line 31 of pilot device No. 2 remains closed and the coil of the time delay relay TD-B is energized at the end of the predetermined time delay. This opens switch TD-B in Line 31 and the master control relay develops a de-energized state that opens relay switch RB in Line 32. When switch RB in Line 32 opens, the time delay relay TD-B in Line 32 is reset and de-energized. As the coil of the time delay relay TD-B in Line 32 in reset and de-energized, the relay switch TD-B in Line 31 closes to again energize the master control relay RB in Line 31. This again closes relay switch RB in Line 32 and energizes the timing mechanism of relay TD-B in Line 32 so that the process continues to repeat itself until the absence of the stopped condition descents. Again, the time interval between the successive energized states that are developed by the master control relay RB is limited by the time response of the circuit components from the instant in time when the relay switch TD-B in Line 31 opens to develop the de-energized state for the master control relay RB in Line 31 to the instant in time that it again closes to develop an energized state for relay RB in Line 31.

The five motor starting relays R10, R20, R30, R40 and R50 for energizing the respective motors or machines control the opening and closing of the respective relay switches R10, R20, R30, R40 and R50 shown at Lines 24 and 26. These relay switches shown in Lines 24 and 26 operate in response to the load relays in Lines 3, 8, 12, 16 and 20 and serve to make and break the motor starting circuits for the respective machines or pump motors Nos. 1 through 5.

Reference is again made to the schematic of FIG. 2 and in particular to the starting circuitry of the control circuit of the motors controlling system. When the controller circuit is initially energized, all relays in both the stopping and starting circuitry are in their de-energized conditions. When the switch of pilot device No. 1 closes in Line 1 because the presence of the start condition is sensed by sensor No. 1, the master start control relay RA in Line 1 is energized through the closed pilot device No. 1 switch and normally closed relay switch TD-A in Line 1. When relay RA in Line 1 is energized, relay switch RA in Line 2 closes to start the timing mechanism of the time delay relay TD-A in Line 2. When the energized state is developed by the master control relay RA in Line 1, all of the normally opened relay switches RA of the motor control starting circuits 101, 103, 105, 107 and 109 are closed, and all of the normally closed relay switches RA of the starting circuit conditioning circuits are opened. None of the conditioning circuits respond as their normally closed relay switches RA open in response to the energized state development by the master starting control relay RA. Except for starting circuit 101, there is a similar lack of response as the normally opened relay switches RA close. The No. 1 pump motor starting circuit 101 however, has a Line 4 circuit which includes normally closed relay switches R11, R21, R31 and R41 and shunts the normally opened relay switch R51. This arrangement is provided to facilitate the initial start up of the motors controlling system and basically provides a preconditioned No. 1 motor starting circuit that facilitates its response to the sensed presence of the start condition when all the motor starting and starting circuit conditioning relays in the system are de-energized. As such, when the master control relay RA in Line 1 is initially energized to start the motors controlling system, the No. 1 motor starting relay RA in Line 3 is energized through the control relay switch RA in Line 3 and the normally closed shunt circuit relay switches R11, R21, R31 and R41. When the No. 1 motor starting relay R10 in Line 3 is energized, relay switch R10 in Line 24 closes to energize the No. 1 motor and relay switch R10 in Line 22 opens to disable the response branch of the No. 1 motor starting circuit conditioning circuit 111, while the relay switch R10 in Line 5 is closed to seal or latch in relay R10 and maintain its energized condition through the normally closed switch R13 and the normally opened relay switch R10 in Line 5. Simultaneously, with the closure of relay switch R10 in Line 5, the relay switch R10 in Line 6 is closed to enable the No. 2 motor starting circuit conditioning circuit 113 and, with the cooperation of the closed relay switch R20 in Line 6, conditions it for response to the next de-energized state development by the master control relay RA in Line 1. At this point in time, none of the other motor starting circuit relays can be energized because the response branch of each circuit contains a circuit disabling open relay switch such as relay switch R11 in Line 8, that can only be closed by energizing the starting circuit conditioning relay, such as relay R11 in Line 6 causes the No. 2 motor starting circuit conditioning circuit 113.

With the conditioning of the No. 2 motor conditioning circuit 113 by the closure of relay switch R10 in Line 6, if one now assumes that the Line 1 switch of pilot device No. 1 opens because the No. 1 pump has lowered the sump fluid level below the pump start condition at level 1 and further assumes that this absence of the start condition has been sensed by sensor No. 1 before the termination of the time delay period for the time delay relay TD-A in Line 1, then the master control relay RA in Line 1 will develop its de-energized state in response to the sensed absence of the start condition by sensor No. 1. This de-energized state development will cause relay switch RA in Line 2 to open to reset the timing mechanism of the time delay relay TD-A in Line 2. The de-energized state development of the master control relay RA in Line 1 will cause the normally opened relay switch RA of starting circuits to again assume their opened positions. The opening of the starting circuit switches RA have no affect on the starting circuits for motors Nos. 2 through 5 inclusive since their starting relays are already de-energized. As for the No. 1 starting circuit 101, the opening of the switch RA in Line 3 has no affect on the No. 1 motor starting relay R10 because the relay is latched in through the normally closed relay switch R13 and normally opened relay switch R10 in Line 5 but it does, however, disable the response branch of this circuit 101.

The de-energized state development of the master control relay RA in Line 1 will also cause the normally closed relay switches RA of the conditioning circuits 111, 113, 115, 117 and 119 to again assume their normally closed positions. This has no affect on the starting circuit conditioning circuits 111, 115, 117 and 119 that are respectively associated with motors Nos. 1, 3, 4 and 5 because the response branch of each conditioning circuit is disabled by an open switch (such as relay switch R20 in Line 10) that is only closed when the motor (such as the No. 2 motor associated with relay R10 in Line 8) preceding the motor (such as the No. 3 motor) with which the conditioning circuit (such as circuit 115) is associated in the cyclic starting order, is energized. However, the No. 2 motor conditioning circuit 113 was conditioned by the closure of relay switch R10 when the No. 1 motor was energized and, as such, with the de-energized state development of the master control relay RA in Line 1 and the closure of the relay switch RA in the response branch of the conditioning circuit 113, No. 2 motor starting circuit conditioning relay R11 in Line 6 is energized through a normally closed relay switches RA and R20 and now closed switch R10 in Line 6. When the No. 2 motor conditioning circuit relay R11 is energized, relay switch R11 in Line 7 closes and seals or latches in the conditioning relay R11 through normally closed relay switch R23 and relay switch R11 in Line 7 to maintain the energized condition of the relay R11 in Line 6. Simultaneously, relay switch R11 in Line 8 responds to the energized relay R11 in Line 6 and closes to condition the No. 2 motor starting circuit 103 for response to the energized state development by the master control relay RA in Line 1. The energizing of the No. 1 motor conditioning relay R11 in Line 6 also opens switch R11 in the bypass circuit of the No. 1 motor starting circuit and disables the shunt part of the response branch of the No. 1 motor starting circuit. At this point in time, under the assumed conditions, the No. 1 motor starting relay R10 in Line 3 and the No. 2 motor starting circuit conditioning relay R11 are energized and the starting branches of all motor starting relay circuits other than for the No. 2 motor are disabled by an open relay switch, such as relay switch R21 in Line 12 for the No. 3 motor starting circuit 105 and which can only be closed by energizing the motor conditioning circuit relay, such as by relay R21 in Line 10 of the No. 3 motor starting circuit conditioning circuit.

If we now assume that the influx of fluid to the sump increases and is sufficient to again cause the presence of the start condition to be sensed in spite of the operation of pump No. 1, the switch of pilot device No. 1 will close and again energize the master control relay RA in Line 1. When this happens, relay switch RA in Line 2 will close to start the time delay mechanism of the time delay relay TD-A in Line 2 and the No. 2 motor starting relay R20 will be energized through the relay switches RA and R11 in Line 8 of the conditioned branch of circuit 103. When the motor starting relay R20 in Line 8 is energized, normally opened relay switch R20 in Line 9 is closed to seal or latch in the No. 2 motor starting relay R20 through normally closed switch R23 and normally closed relay switch R20 in Line 9. Relay R20 is the output relay for energizing machine or pump No. 2 and upon being energized, closes relay switch R20 at Line 24 to energize the No. 2 motor. At the same time, switch R20 in Line 24 closes, relay switch R20 in Line 10 closes to enable the No. 3 motor starting circuit conditioning circuit 115, and in cooperation with normally closed relay switch R30 in Line 10, conditions it for response to the next de-energized state development by the master control relay RA in Line 1. The energizing of relay R20 in Line 8 also opens the normally closed relay switch R20 in Line 6 to disable the response branch of the No. 2 motor conditioning circuit. At this point in time, the No. 1 and No. 2 motors and their motor starting relays R10 and R20 are energized, as well as the No. 1 motor starting circuit conditioning relay R11.

If one now assumes that the combined pumping capacity of the No. 1 and No. 2 pumps is sufficient to lower the sump fluid level to below the start condition at Level 1, and that the absence of the start condition is sensed before the time delay period expires for the time delay relay TD-A in Line 2 to actuate the relay switch TD-A in Line 1, then the switch in Line 1 for the No. 1 pilot device will again open for the second time and de-energize the master starting control relay RA in Line 1. The de-energized state development by the master control relay RA in Line 1 will again open relay switch RA in Line 2 to reset the timing mechanism of time delay relay TD-A and will also again open all of the normally opened relay switches RA and starting circuits 101, 103, 105, 107 and 109 without affect since the starting relays of these circuits are either energized and already latched in (as is the case with starting relay R10 and R20) or de-energized (as in the case with starting relays R30, R40 and R50). As for the starting circuit conditioning circuits, the development of the de-energized state by relay RA in Line 1 will again close the normally closed relay switches RA in the response branches of the conditioning circuits 111, 113, 115, 117 and 119. This has no affect on the No. 1 and No. 2 motor conditioning circuits 111 and 113 because their response branches are disabled by the normally closed relay switches R10 and R20 in Lines 22 and 6 respectively and which are now opened and operating under the control of the energized No. 1 and No. 2 motor starting relays R10 and R20 in Lines 3 and 8. The closing of the relay switches RA in their response branches of the No. 4 and No. 5 motor conditioning circuits also has no affect since the response branch circuits are unconditioned and disabled by the open circuit disabling relay switches R30 and R40 in Lines 14 and 18 respectively. As for the No. 3 motor starting circuit conditioning circuit 115, however, it was placed in condition to respond to the de-energized state of the master control relay when the No. 2 motor was energized by starting relay R20 in Line 8. As such, the No. 3 motor starting circuit conditioning relay R21 in Line 20 is energized through relay switches RA, R30 and R20 in Line 10 when the master control relay RA is de-energized. When the No. 3 motor starting circuit conditioning relay R21 in Line 10 is energized, switch R21 in Line 11 closes to latch in and maintain the energized condition of the relay, switch R20 in Line 12 is closed to condition the No. 3 motor starting circuits for response to the next energized state development by the master control relay RA in Line 1, and relay switch R21 in the Line 4 shunt circuit is opened to further disable the shunt circuit. At this point in time in the starting circuitry, the No. 1 and No. 2 motor starting relays R10 and R20 are energized as well as the No. 2 and No. 3 motor conditioning relays R11 and R21.

If we once again assume that the influx of fluid to the sump increases and in amounts sufficient to cause the presence of the start condition to be sensed in spite of the operation of pumps Nos. 1 and 2, the switch of the pilot device No. 1 in Line 1 will again close and through normally closed time delay switch TD-A energize the master control relay RA in Line 1. When this relay is energized, relay switch RA in Line 2 closes to start the timing mechanism of time delay relay TD-A in Line 2 and the normally closed relay switch RA of the conditioning circuits 111, 113, 115, 117 and 119 are opended without affect since the response branch of each is either disabled by an open relay switch and/or the circuit conditioning relay is energized through the parallel latching circuit. However, when the control relay RA in Line 1 is energized, it also closes all of the relay switches RA of the starting circuits 101, 103, 105, 107 and 109. This has no affect as far as circuits 101 and 103 are concerned because the starting relays in these circuits are already energized and latched in. It also has no affect as far as circuits 107 and 109 are concerned because the response branches of these circuits are disabled by open relay switches R31 and R51 in Lines 16 and 20 respectively. The No. 3 motor starting circuit 105, however, was previously conditioned by the closure of relay switch R21 when the master control relay was last de-energized and as such, circuit 105 is energized by the closure of relay switch RA in Line 12. This energizes the No. 3 motor starting relay R30 through switches RA and R21 in Line 12. When relay R30 in Line 12 is energized, relay switch R30 in Line 13 closes to latch in the No. 3 motor starting relay R30 through normally closed relay switch R33 and now closed switch R30 in Line 13. As the No. 3 motor starting relay is energized, it also closes the relay switch R30 in Line 14 to condition the response branch of the No. 4 motor starting circuit conditioning circuit 117 for response to the next de-energized state of the master control relay RA. Switch R30 in Line 10 also opens when the No. 3 motor starting relay R30 is energized so as to disable the response branch of the No. 3 motor starting circuit conditioning circuit 115. Relay R30 is the output relay for energizing machine or motor No. 3 and upon being energized, closes relay switch R30 at Line 24 to energize the No. 3 motor. At this point in time, pump motors Nos. 1, 2 and 3 are energized as are their associated starting relays R10, R20 and R30 and the starting circuit conditioning relays R11 and R21 for motors Nos. 2 and 3.

If we now assume that the pumps Nos. 1, 2 and 3 provide sufficient pumping capacity to lower the sump fluid level below level 1 and that sensor No. 1 responds to the absence of the start condition before the delay period of the timing mechanism expires, the switch in Line 1 of the pilot device No. 1 will open and de-energize the master control relay RA in Line 1. This will cause switch RA in Line 2 to open and thereby reset the timing device and also cause the relay switches RA in the response branches of the starting circuits 101, 103, 105, 107 and 109 to open and without affect since either of these starting relays is already energized and latched in or the response branch is disabled by an open switch that operates under the control of the conditioning relay for the motor associated with the starting circuit. When the master control relay RA in Line 1 develops its de-energized state, all of the normally closed relay switches RA for the conditioning circuits 111, 113, 115, 117 and 119 return to their closed positions. This has no affect as far as conditioning circuits 111, 113, 115 and 119 are concerned but completes the response branch for energizing the No. 4 circuit conditioning relay R31 in Line 14 through relay switches RA, R40 and R30 in Line 14. When the No. 4 motor starting circuit conditioning relay R31 is energized, relay switch R31 in Line 15 is closed to latch in and maintain the energized condition of the relay R31 through normally closed relay switches R43 and R31 in Line 15. Switch R31 in Line 4 also opens to further disable the shunt circuit branch of the No. 1 motor starting circuit 101 and relay switch R31 in Line 16 closes to conditioning the No. 4 motor starting circuit for response to the next energized state development by master control relay RA in Line 1. At this point in time, pump motors Nos. 1, 2 and 3 are energized as are their starting relays R10, R20 and R30 and the starting circuit conditioning relays R11, R21, and R30 associated with motor Nos. 2, 3 and 4.

The No. 4 and No. 5 motors may also be sequentially energized by a pair of sequential switch "closings and openings" by pilot device No. 1. However, in order to better illustrate the operation of the system, it will be assumed that after the first three pump motors, Nos. 1, 2 and 3 have been energized, the fluid level in the sump diminishes to the low level 2 at which pressure sensor No. 2 senses the presence of the stopped condition.

Before discussing the effect of the sump fluid level drop to the low level stop condition at level 2, it should be pointed out that as each motor is energized, two relay switches in the stopping circuitry respond as the starting relay for the motor is energized. One relay switch is normally opened to enable the response branch of the stopping circuit conditioning circuit for the motor and is closed to enable the circuit and partially condition it for response to a de-energized state development by the master stop control relay RB in Line 31. The other relay switch is normally closed to enable and partially condition the response branch of the stopping circuit conditioning circuit for the motor next succeeding the energized motor in the starting cyclic order for response to a de-energized state development by the master stopping control relay RB in Line 31, and is opened to disable the response branch of the circuit. This arrangement makes it mandatory for the preceding motor in the cyclic order to be de-energized at the time the stopping circuit conditioning circuit for the motor is energized to condition the stopping circuit for response to the next energized state developed by the master control relay RB.

Because of this switching arrangement in the stopping circuitry, relay switch R10 in Line 33 was closed and relay switch R10 in Line 36 was opened when the No. 1 motor starting relay in Line 3 was energized. When the presence of the start condition was being sensed by sensor No. 1, the absence of the stop condition was being sensed by sensor No. 2. Consequently, when the No. 1 motor starting relay R10 was energized, relay switch R10 in Line 33 was closed. As such, the No. 1 motor stopping circuit conditioning relay R12 in Line 33 was energized through relay switches RB, R50 and R10 in Line 33. However, when relay switch R10 in Line 36 was opened, the No. 2 motor starting relay was de-energized so that relay switch R20 was opened and the response branch of circuit 123 was disabled. The energizing of relay R12 in Line 33 caused relay switch R12 in Line 34 to close and latch in relay R12 through relay switches R22 and R12 in Line 34 and thereby maintain the energized condition of the relay. When the relay R12 was energized, it also closed relay switch R12 in Line 35 and thereby conditioned the No. 1 motor stopping circuit for response to the next energized state development by the master stopping control relay RB. It also opened relay switch R12 in Line 46 to disable the sealing or latching branch of the No. 5 motor stopping circuit conditioning circuit 139.

When the No. 2 motor starting relay R20 was energized, relay switch R20 in Line 36 was closed to enable and partially condition the response branch of circuit 123 for response to a de-energized state development by the master stopping control relay RB. Simultaneously, relay switch R20 in Line 39 was opened to disable the response branch of the No. 3 motor stopping circuit conditioning circuit 125. When the No. 3 motor starting relay R30 was energized, relay switch R30 in Line 39 was closed to enable and partially condition the response branch of circuit 125 for response to a de-energized state development by the master stopping control relay RB. Simultaneously, relay switch R30 in Line 42 was opened to disable the response branch of the No. 4 motor stopping circuit conditioning circuit 127. Accordingly, at the time the fluid level in the sump is diminishing to the low level 2 at which the presence of the stop condition will be sensed, pump motors Nos. 1, 2 and 3 are energized, the Nos. 1, 2 and 3 motor starting relays R10, R20 and R30 are energized, the Nos. 2, 3 and 4 motor starting circuit conditioning relays R11, R21 and R31 are energized, and the No. 1 motor stopping circuit conditioning relay R12 is energized.

With this circuit status in mind, the switch in Line 31 of the pilot device No. 2 is closed as the No. 2 sensor senses the presence of the stop or low fluid level condition at level 2. This energizes the master control stopping relay RB in Line 31 through the No. 2 pilot device switch and normally closed relay switch TD-B in Line 31. When the master control relay RB in Line 31 is energized, relay switch RB in Line 32 closes to start the timing device of time delay relay TD-B in Line 32. Simultaneously, all normally closed relay switches RB in the response branches of the stopping circuit conditioning circuits 121, 123, 125, 127 and 129 are opened and all of the normally opened relay switches RB in the stopping circuits 131, 133, 135, 137 and 139 are closed. The switch openings have no electrical affect on the relays and the switch closings in starting circuits 133, 135, 137 and 139 also have no such affect since none of these conditioning circuits are conditioned for response to the switch closings. On the other hand, the No. 1 motor stopping circuit is conditioned by a now closed relay switch R12 in Line 35 and, as such, the No. 1 motor stopping relay R13 is energized through relay switches RB and R12 in Line 35 when the master control relay RB develops the energized state.

When the No. 1 motor stopping relay is energized, the relay switches R13 in Lines 5 and 23 of each of the latching or sealing branches of the No. 1 motor starting circuit 101 and its conditioning circuit 111 are opened. This has no electrical affect on the No. 1 motor conditioning relay in Line 22 because it is already de-energized. However, the opening of switch R13 in Line 5 de-energizes the No. 1 motor starting relay R10 in Line 3.

In the starting circuitry, when relay R10 in Line 3 is de-energized, the relay switch R10 in Line 24 is opened to stop the No. 1 motor and pump, relay switch R10 in Line 5 is opened to disable the latching or sealing branch until the relay R10 is again energized through the response branch, the relay switch R10 in Line 6 is opened to disable the response branch of the No. 2 motor starting circuit conditioning circuit 113, and relay switch R10 in Line 22 is closed to enable and partially condition the response branch of the No. 1 motor starting circuit conditioning circuit 111. In the stopping circuitry, when the No. 1 motor starting relay component R10 in Line 3 is de-energized, the relay switch R10 in Line 3 opens to disable the response branch of the No. 1 motor starting circuit conditioning circuit 121, and the relay switch R10 in Line 36 closes to enable and cooperate with the now closed relay switch R20 in Line 30 in conditioning the response branch of the No. 2 motor stopping circuit conditioning circuit 123 for response to the next de-energized state development by the master stopping control RB in Line 31. At this point in time, motors Nos. 2 and 3 are energized as well as their starting relays R20 and R30 and the starting circuit conditioning relays R11, R21 and R31 for motor Nos. 2, 3 and 4. Also energized are the No. 1 motor stopping relays R13 in Line 35 and its conditioning relay R12 in Line 33.

If one now assumes that the pumping capacity of the No. 2 and No. 3 pumps is insufficient to maintain a low sump fluid level stop condition at or below level 2 and that the pump level rises above level 2 before the expiration of the time delay period for time delay relay TD-B, then the pilot device No. 2 switch in Line 31 will open as the absence of the stop condition is sensed by sensor No. 2. When this switch opens the master control stop relay RB develops its de-energized state and the timing mechanism of the time delay relay TD-B in reset as relay switch RB in Line 3 simultaneously moves to its normally opened position. When the master stopping control relay RB is de-energized, all relay switches RB in the stopping circuits 131, 133, 135, 137 and 139 assume their normally opened positions. This has no affect electrically on stop circuits 133, 135, 137 and 139 but breaks the No. 1 motor stopping circuit 131 and de-energizes the No. 1 motor stopping relay R13 in Line 35.

When the No. 1 motor stopping relay R13 is de-energized, relay switches R13 in Lines 5 and 23 return to their normally closed positions to enable and condition the relay latching circuits in Lines 5 and 23 of the No. 1 motor starting circuit 101 and its conditioning circuit 111 for response to the next time the respective relays are energized. When the master stopping control relay assumes its de-energized state, all the relay switches RB in the stopping circuit conditioning circuits 121, 123, 125, 127 and 129 are closed. Since the No. 2 motor is energized and the No. 1 motor is de-energized, the No. 2 motor stopping circuit conditioning circuit 123 is conditioned for response at this time, the No. 2 motor stopping circuit conditioning relay R22 in Line 36 is energized through relay switches RB, R10 and R20 in Line 36 as switch RB in Line 36 closes. When this happens, relay switch R22 in Line 34 is opened to disable the latching branch circuit in Line 34 for the No. 1 motor starting circuit conditioning relay R12. Simultaneously relay switch R22 in Line 35 is closed to seal or latch in the No. 2 motor stopping circuit conditioning relay R22 through relay switches R32 and R22 in Line 37, and relay switch R22 in Line 38 closes to condition the No. 2 motor stopping circuit for response to the next energized state development by the master stopping control relay RB. At this point in time, motor Nos. 2 and 3 remain energized as well as their starting relays R20 and R30 and the starting circuit conditioning relays R11, R21 and R31 for motor Nos. 2, 3 and 4. In the stopping circuitry, the No. 2 motor stopping circuit conditioning relay R22 is energized.

If one now assumes that the influx of fluid to the sump continues to exceed the pumping capacity of the No. 2 and the No. 3 motors, the sump fluid level will continue to rise to the point at which it reaches the start condition at level 1. When this happens, the start condition is sensed by sensor No. 1 and the No. 1 pilot device switch in Line 1 is closed. This completes the energizing circuit for the master starting control relay RA through the No. 1 pilot device switch in the time delay relay switch TD-A in Line 1.

When the master starting control relay RA again develops an energized state, relay R10 can not be energized as switch R51 is disabling the response branch in Line 3 and opens switches R11, R21 and R31 in Line 4 are disabling the shunt portion of the response branch of circuit 101. However, the No. 4 motor starting relay R40 in Line 16 is energized through the closed relay switches RA and R31 in Line 16. When relay R40 is energized, the sealing or latching circuit in Line 12 is completed through normally closed relay switch R43 and relay switch R40 in Line 17. Relay R40 is the output relay that controls pump motor No. 4 through switch R40 in Line 35 and energizes the No. 4 motor when it is energized. Relays R11, R20, R21, R30, R31 and R40 at this point remain energized.

When the No. 4 motor starting relay R40 was energized, relay switch R40 in Line 18 closed to condition the response branch of the No. 5 motor starting circuit conditioning circuit for response to the next de-energized state development by the master starting control relay RA. As such, when the master starting control relay RA in Line 1 again develops its energized state, normally opened relay switch RA in Line 18 returns to its normally closed position. This completes the response branch in Line 18 of the No. 5 motor starting circuit conditioning circuit 119 through normally closed switch R50 and now closed switch R40. This energizes relay R41 and closes relay switch R41 in Line 19 to seal or latch in the relay through normally closed switch R53 and now closed relay switch R41 in Line 19. When the No. 4 motor starting circuit conditioning relay R41 in Line 18 was energized, switch R41 in Line 20 closed to condition the response branch of the No. 5 motor starting circuit 109 for response to the next energized state development by the master starting control relay RA. As such, at this point in time, relays R11, R20, R21, R30, R31, R40 and R41 remain energized and pump motors Nos. 2, 3 and 4 are energized.

Pump motor No. 2 is now assumed to be stopped by energizing the No. 2 motor stopping relay R23 in Line 38. When this relay R23 is energized, the relay switch R23 in Line 9 opens to thereby disable the latching branch of the No. 2 motor starting circuit 103 is de-energizes relay R20 in Line 8. Similarly, the No. 2 motor starting circuit conditioning relay R11 is de-energized as switch R23 in Line 7 is opened to disable the sealing circuit of the No. 2 motor starting circuit conditioning circuit 113 and thereby de-energizes relay R11 in Line 6. At this point, relays R21, R30, R31, R40 and R41 remain energized and pump motors Nos. 3 and 4 are energized.

When the master control relay RA is again energized, the No. 1 and No. 2 motor relays R10 and R20 can not be re-energized because the response branches are disabled by opened relay switches R51 and R11 in Lines 3 and 8. However, the response branch of the No. 5 motor starting circuit 109 has been conditioned by the prior closure of relay switch R41 in Line 20 and thus the No. 5 motor starting relay R50 in Line 20 is energized through the closed relay switches RA and R41 in Line 20. This causes relay switch R50 in Line 21 to close and seal in or latch in relay R50 through normally closed switch R53 in Line 21. Relay R50, being the output relay which controls pump No. 5 through switch R50, causes this switch to close and thereby energize pump No. 5. At this point relays R21, R30, R31, R40, R41 and R50 are energized as are pump motors Nos. 3, 4 and 5.

When the No. 5 motor starting relay R50 is energized, relay switch R50 in Line 22 closes to enable and with the cooperation of normally closed relay switch R11, condition the No. 1 motor starting circuit conditioning circuit for response in the next de-energized state development by the master starting control relay RA. As such, when the master starting control relay RA is again de-energized, relay switch RA in Line 22 is returned to its normally closed position. This completes the response branch in Line 22 of the No. 1 motor starting circuit conditioning circuit 111 through normally closed relay switches R10 and RA and closed switch R50 in Line 22 and energizing relay R51. When relay R51 in Line 22 is energized, switch R51 in Line 23 closes and seals in the relay R51 through normally closed switch R13 and now closed switch R51 in Line 23. When relay R51 is energized, switch R51 in Line 3 closes to condition the No. 1 motor starting circuit 101 to respond to the next energized state development by relay RA. At this point, pump motor Nos. 3, 4 and 5 would be energized and relays R21, R30, R31, R40, R41, R50 and R51 are also energized.

The next time relay RA is energized, the No. 1 motor starting relay R10 will be energized through closed switches RA and R51 in Line 3 to thereby energize the No. 1 motor. Pump motor Nos. 3, 4, 5 and 1 would then be energized. Thereafter when the master control relay again is energized, relay R20 would be energized and thereby energize pump motor No. 2.

So far it has been assumed that each time the presence of a start or a stop condition was sensed, the change in pumping capacity was sufficient to provide an absence of the stop or start condition before the time period for the time delay device expired. To better illustrate the operation of the time delay mechanism, it may be assumed that pump motors Nos. 1, 2 and 3 have been energized in the order mentioned and that the influx of fluid to the sump has ceased and the sump fluid level is below level 1 and falling toward level 2. Under such circumstances, the No. 1, No. 2 and No. 3 motor starting relays R10, R20 and R30 are energized, the No. 2, 3 and 4 motor starting circuit conditioning relays R11, R21 and R31 are energized, and the No. 1 motor stopping circuit relay R12 is energized. As such, the No. 1 motor stopping circuit 131 is conditioned for response to the next energized state development by the master stop control relay RB in Line 31 and the No. 4 motor starting circuit 107 is conditioned for response to the next energized state development by the master starting control relay RA in Line 1.

When the sump fluid level falls to the stop level 2, sensor No. 2 senses the presence of the stopped condition and the No. 2 pilot device responds and closes its switch in Line 31 to complete the circuit for energizing the master stopping control relay RB through the time delay relay swtich TD-B in Line 31. When the master control relay RB develops the energized state, relay switch RB in Line 32 closes. This energizes and starts the timing mechanism of the time delay relay TD-B in Line 32. Simultaneously, with the closing of relay switch RB in Line 31, switch TB in Line 35 closes to energize the No. 1 motor stopping relay R13 through relay switches R12 and RB in Line 35.

When relay R13 is energized, relay switch R13 in Line 5 is opened to disable the latching branch of the No. 1 motor starting circuit 101 and thereby de-energize the No. 1 motor starting relay R10 in Line 3 as well as the No. 1 pump motor. Simultaneously, the relay switch R13 in Line 23 is opened to disable the latching branch of the No. 1 motor starting circuit conditioning circuit 111.

When relay R10 is de-energized, the relay switch R10 in Line 6 opens to disable the response branch of the No. 2 motor starting circuit conditioning circuit 113 and the relay switch R10 in Line 22 opens to enable and partially condition the response branch of the No. 1 motor starting circuit conditioning circuit 111 for response to a de-energized state development by the master starting control relay RA. When relay R10 is de-energized, switch R10 in Line 33 also opens to disable the response branch of the No. 1 motor stopping circuit conditioning circuit and simultaneously, switch R10 closes in Line 36 to condition the No. 2 motor stopping circuit conditioning circuit 123 for response to the next de-energized state development by the master stopping control relay RB.

At this point in time, the Nos. 2 and 3 motor starting relays R20 and R30 remain energized and the Nos. 2, 3 and 4 motor starting circuit conditioning relays R11, R21 and R31 also remain energized. In addition, the No.

1 motor stopping circuit conditioning relay R12 and the No. 1 motor stopping relay R13 are energized. As such, the No. 2 motor stopping circuit conditioning circuit 123 is conditioned for response to the next de-energized state development by the master stopping control relay RB and the No. 4 motor starting circuit 107 remains conditioned for response to the next energized state development by the master starting control relay RA in Line 1.

It may be assumed that the presence of the stopped condition rmeains as being continuously sensed so that the time delay period for the time delay relay TD-B in Line 31 expires. When this predetermined time period expires, the relay coil is energized and the time delay switch TD-A in Line 31 opens momentarily so that the master control stopping relay RB develops a de-energized state. This opens switch RB in Line 31 to de-energize the time delay relay and reset the timing mechanism thereof. As a result, the time delay switch TD-B in Line 31 again closes to re-energize the master stopping control relay RB. This de-energizing and re-energizing of relay RB transpires during a time interval that is limited by the response of the time delay relay and the control relay RB.

When the de-energized state is developed by the master stopping relay RB, the relay switch RB in Line 35 opens to disable the No. 1 motor stopping circuit 131 and thereby de-energize the No. 1 motor stopping relay R13. Simultaneously, the relay switch RB in Line 36 closes to complete the response branch of the No. 2 motor stopping circuit conditioning circuit 123 and thereby energize the No. 2 motor stopping circuit conditioning relay R22.

When the No. 1 motor stopping relay R13 is de-energized, the latching branch of the No. 1 motor starting circuit is enabled by the closure of relay switch R13 in Line 5 and thereby conditioned for response to the next time the relay R10 is energized. Simultaneously, the latching branch of the No. 1 motor starting circuit conditioning circuit 111 is enabled by the closure of relay switch R13 in Line 33 and thereby conditioned for response the next time relay R51 is energized through the response branch of the circuit.

When the No. 2 motor stopping circuit conditioning relay R22 is energized, relay switch R22 in Line 38 closes to complete the latching branch of circuit 123. Simultaneously, relay switch R22 in Line 38 closes to condition the No. 2 motor stopping circuit for response to the next energized state development by the master stopping control relay RB. The energizing of the No. 2 stopping circuit conditioning relay R22 also opens the relay switch R22 in Line 34 and thereby disables the latching branch of the No. 1 motor stopping circuit conditioning circuit and de-energizes the No. 1 motor stopping circuit conditioning relay R12.

When the conditioning relay R12 is de-energized, the latching branch of the No. 1 motor stopping circuit conditioning circuit 121 is disabled by the opening of switch R12 in Line 34. Simultaneously, the relay switch R12 in Line 35 opens and disables the No. 1 motor stopping circuit 131 and relay switch R12 in Line 46 closes to enable the latching branch of the No. 5 motor stopping circuit conditioning circuit 129 and thereby conditions it for response when relay R52 is next energized through the response branch of the circuit.

At this point in time during the interval between the actuation of the switch TD-B in Line 31 to develop the de-energized state for relay RB and its reactuation to re-energize relay RB, the No. 2 and 3 pump motors, the No. 3 and 2 motor starting relays R30 and R20, and the Nos. 2, 3 and 4 motor starting circuit conditioning relays R11, R21 and R31 are energized. As for the stopping circuitry, the No. 2 motor stopping circuit conditioning relay R22 is energized and the No. 2 motor stopping circuit 133 is conditioned for response to the next energized state development by the master stopping control relay RB. The No. 4 motor starting circuit 107, of course, remains conditioned for response to the next energized state development by the master starting control relay RA.

When the master stopping control relay RB is re-energized by the closure of relay switch TD-B during the prolonged sensed presence of the stopping condition, the relay switch RB in Line 38 closes to complete the No. 2 motor stopping circuit 133 and thereby energize the No. 2 motor stopping relay R23. When this relay is energized, the relay switch R23 in Line 9 opens to disable the latching branch for the No. 2 motor starting circuit 109 and thereby de-energize the No. 2 motor starting relay R20 and the No. 2 pump motor. Simultaneously, relay switch R23 in Line 7 opens to disable the latching branch of the No. 2 motor starting circuit conditioning circuit 113 and thereby de-energize relay R11.

When the No. 2 motor starting relay R20 is de-energized, the No. 2 pump motor is de-energized and relay switch R20 opens to disable the response branch of the No. 3 motor starting circuit conditioning circuit. Simultaneously, the relay switch R20 in Line 6 closes to enable the response branch of the No. 2 motor starting circuit conditioning circuit 113 and partially condition the branch for response to energized state development by relay RA. When the No. 2 motor starting relay R10 is de-energized, the response branch of the No. 2 motor stopping circuit conditioning circuit 123 is disabled by the opening of relay switch R20 in Line 36 and the response branch of the No. 3 motor stopping circuit conditioning circuit 125 is conditioned by the closing of relay switch R20 in Line 39 for response to the next master stopping control relay development of the de-energized state.

When the No. 2 motor starting circuit conditioning relay R11 is de-energized, the response branch of the No. 2 motor starting circuit 103 is disabled by the opening of relay switch R11 in Line 8 and the shunt portion of the response branch of the No. 1 motor starting circuit 101 is enabled and partially conditioned by the closure of relay switch R11.

At this point in time, the No. 3 motor is the only motor energized and the No. 2 motor stopping relay R23 and the No. 2 motor stopping circuit conditioning circuit relay R22 remain energized. In addition, the No. 3 motor starting relay R30 and the No. 3 and No. 4 motor starting circuit conditioning relays R21 and R31 remain energized. Furthermore, the No. 3 motor stopping circuit conditioning circuit 125 is conditioned for response to the next de-energized state development by the master stopping control relay RB and the No. 4 motor starting circuit 107 remains conditioned for response to the next energized state development by the master starting control relay RA.

So far the No. 1 and the No. 2 pump motors have been stopped while the presence of the stopped condition is continuously being sensed by sensor No. 2. Assuming that the stopped condition presence is further prolonged and sensed by sensor No. 2, then the time delay period for the time delay relay TD-B will again expire to energize the coil of the time delay relay TD-B in Line 32 and open relay switch TD-B in Line 31. This will cause the master stopping control relay RB to develop its de-energized state so that the switch RB in Line 32 opens to reset the time delay relay TD-B in Line 32 and closes switch TD-B in Line 31 to re-energize the master starting control relay RB.

During the time interval that the master stopping control relay is de-energized, the No. 2 motor stopping circuit 133 is disabled by the opening of the switch RB in Line 38 to de-energize relay R23, and the response branch in the No. 3 motor stop stopping circuit conditioning circuit 125 is completed by the closure of switch RB in Line 39 to energize the No. 3 motor stopping circuit conditioning relay R32.

When the No. 2 motor stopping relay R23 is de-energized, the latching branch of the No. 2 motor starting circuit 103 is enabled by the closure of switch R23 in Line 9 and thereby conditions for response when relay R20 is again energized, and the latching branch of the No. 2 motor starting circuit conditioning circuit 113 is enabled and conditioned by the closure of switch R23 in Line 1 for response when relay R11 is again energized through its response branch.

When the No. 3 motor stopping circuit conditioning relay R32 is energized, the latching branch of the No. 3 motor stopping circuit conditioning circuit 125 is completed by the closure of relay switch R32 in Line 40, the No. 3 motor stopping circuit 135 is conditioned for response to the next de-energized state development by the master stopping control relay RB by the closure of relay switch R32 in Line 41, and the latching branch of the No. 2 motor stopping circuit conditioning circuit 123 is disabled by the opening of relay switch R32 in Line 37 to de-energize the No. 2 motor stopping circuit conditioning relay R22.

When the No. 2 motor stopping circuit conditioning relay R22 is de-energized, relay switch R22 in Line 37 opens to disable the latching branch of circuit 123, relay switch R22 in Line 38 opens to disable circuit 133 and relay switch R22 in Line 34 closes to enable the latching branch of the No. 1 motor stopping circuit conditioning circuit 121.

At this point during the time interval, the No. 3 motor remains energized as well as the No. 3 motor starting relay R30 and its starting circuit conditioning relay R21. In addition, the No. 3 motor stopping circuit conditioning relay R32 and the No. 4 motor starting circuit conditioning relay R31 are energized. This leaves the No. 3 motor stopping circuit 135 in condition for response to the next de-energized state of the master stopping control relay RB and the No. 4 motor starting circuit 107 in condition for response to the next energized state development by relay RA.

When the master stopping control relay RB is again energized at the end of the time interval, switch RA in Line 2 again closes and starts the timing mechanism of the time delay relay TD-A. Simultaneously, the No. 3 motor stopping circuit is completed by the closure of relay switch RB in Line 41 and the No. 3 motor stopping relay R33 is energized. When this happens, relay switch R33 in Line 13 opens to disable the latching branch of the No. 3 motor starting circuit 105 and de-energize the No. 3 motor starting relay to stop pump No. 3. Simultaneously, relay switch R33 in Line 11 is opened to disable the latching branch of the No. 3 motor starting circuit conditioning circuit 115 and thereby de-energize the No. 3 motor starting circuit conditioning relay R21.

When the No. 3 motor starting relay R30 is de-energized, the response branch of the No. 4 motor starting circuit conditioning circuit 117 is disabled by the opening of relay switch R30 in Line 14, the response branch of the No. 3 motor starting circuit conditioning circuit 115 is enabled and partially conditioned for response to a de-energized state development by the master starting control relay RA, the response branch of the No. 3 stopping circuit conditioning circuit 125 is disabled as relay switch R30 opens in Line 39, and relay switch R30 in Line 42 closes to enable the response branch of the No. 4 motor stopping circuit conditioning circuit and thereby partially conditioning it for response to a de-energized state development by the master stopping control relay RB.

When the No. 3 motor starting circuit conditioning relay R21 is de-energized, relay switch R21 in Line 12 opens to disable the response branch of the No. 3 motor starting circuit 105, and relay switch R21 in Line 4 closes to enable and partially condition the shunt portion of the response branch of the No. 1 motor starting circuit 101. At this point in time, the No. 4 motor starting circuit conditioning relay R31, the No. 3 motor stopping relay R33, and the No. 3 motor stopping circuit conditioning relay R32 are energized while the No. 4 motor starting circuit 107 is conditioned for response to the next energized state development by the master starting control relay RA.

When the time delay period for the time delay mechanism expires, the coil of the time delay relay TD-A in Line 31 is energized to open relay switch TD-A in Line 30 and thus to develop a de-energized relay state for the master stopping control relay RB. When this happens, relay switch RB in Line 41 opens to disable the No. 3 motor stopping circuit 125 and thereby de-energize the No. 3 motor stopping relay R33. When relay R33 is de-energized, relay switch R33 in Line 13 closes to enable the latching branch of the No. 3 motor starting circuit and thereby condition it for response when relay R30 is again energized. Simultaneously, relay switch R33 in Line 11 closes to enable the latching branch of the No. 3 motor starting circuit conditioning circuit 115 and thereby condition it for response when the relay R21 is again energized.

At this point in time, all motors have been stopped and the No. 4 motor starting circuit conditioning relay R31 remains energized. As such, the No. 4 motor starting circuit 107 is conditioned and ready to respond to the next demand for a pump. No. 3 motor stopping circuit conditioning relay R32 also remains energized. However, when the No. 4 motor is started, the latching branch of circuit 125 will be disabled as the No. 4 motor stopping circuit conditioning circuit 127 is completed in response to the energizing of the No. 4 motor starting relay R40.

Close observation of FIG. 2 will show that before a motor stopping circuit can operate to stop or de-energize its motor, its stopping circuit relay must be energized. However, in order for this to be accomplished, the starting circuit for the prior motor in the cyclic starting order must be de-energized and the motor itself must be energized. Thus, in the No. 3 stopping circuit conditioning circuit 125, the No. 3 motor starting relay R30 must be de-energized to maintain the open relay switch R30 conditioned in the response branch of circuit 125 and the relay switch R20 in Line 38 must be closed and thus reflect a deenergized state for the No. 2 motor in order for circuit 125 to be energized. Furthermore, the latching branch for a stopping circuit conditioning circuit is disabled as soon as the stopping circuit conditioning circuit for the next motor in the cyclic starting order is completed. All of this contributes to the sequential stopping of the motors in the same order in which they were energized.

Reference is now made to FIG. 4 and which is a logic block diagram equivalent of the relay embodiment shown in FIG. 2 but without the master starting and stopping control circuits 141 and 143. The motors controlling system depicted in FIG. 4 comprises a plurality of associated circuits and circuit components that are in turn associated with the respective motor of a group of motors that are to be sequentially started and stopped upon demand and in the same cyclic or repeating order. Each of the five motors is associated with a motor control starting circuit for starting the motor, and a starting circuit conditioning circuit for conditioning the motor starting circuit to respond to a start signal state that reflects the presence of a condition that calls for the starting of the motor. Each motor is also associated with a motor control stopping circuit for stopping the motor and a stopping circuit conditioning circuit for conditioning the stopping circuit to respond to a stopped signal that reflects the presence of a condition that calls for the stopping of the motor. This grouping and association is clearly shown by the following table which specifies the relays used in the circuits associated with the respective motors. In the starting circuitry of the system, the motor starting relays have been designated as "S.M.R." and the starting circuit conditioning relays have been designated as "S.L.R.". In the stopping circuitry of the system, the motor stopping relays have been designated as "T.M.R." and the stopping circuit conditioning relays have been designated as "T.L.R.".

circuit 113. The No. 2 motor control starting circuit 103 has an output that is coupled to an input of the No. 3 motor starting circuit conditioning circuit 115, to an input of the No. 3 motor stopping circuit conditioning circuit 125, to an input of the No. 2 motor starting circuit conditioning circuit 113, and to an input of the No. 2 motor stopping circuit conditioning circuit 123.

The motor control starting circuits 101, 103, 105, 107 and 109 basically function to start the respective motors and as conditioned by the respective starting circuit conditioning circuits 111, 113, 115, 117 and 119, serve to sequentially energize and start the motors in a predetermined cyclic starting order and in response to the successive developments of the motor start signals by the master starting control circuit. These start signals are delivered over lines A to the inputs of the motor starting circuits and their conditioning circuits. Similarly, the stop signals are delivered over the lines B to the inputs of the motor stopping circuits and their conditioning circuits. These start and stop signals represent the voltage pulses developed across the master control starting and stopping relays RA and RB respectively of the master starting and stopping control circuits 141 and 143 respectively, as seen in FIG. 2.

The starting circuit conditioning circuits 111, 113, 115, 117 and 119 basically function to sequentially condition the respective motor control starting circuits 101, 103, 105, 107 and 109 for response to successive developments of the start signals, one at a time and in a predetermined cyclic order for starting their associated motors.

The stopping circuit conditioning circuits 121, 123, 125, 127 and 129 basically function to condition the stopping circuit conditioning circuits 131, 133, 135, 137 and 139 for response to successive developments of the stop signals, one at a time and in the same cyclic order used for starting their associated motors.

The motor control stopping circuits 131, 133, 135,

| | GROUP | | | | | | | | | |
|---|---|---|---|---|---|---|---|---|---|---|
| | Pump Motor No. 1 | | Pump Motor No. 2 | | Pump Motor No. 3 | | Pump Motor No. 4 | | Pump Motor No. 5 | |
| | Ckt. | Relay | Ckt. | Relay | Ckt. | Relay | Ckt. | Relay | Ckt. | Relay |
| Motor Control Starting Circuit | 101 | S.M.R. #1  R10 | 103 | S.M.R. #2  R20 | 105 | S.M.R. #3  R30 | 107 | S.M.R. #4  R40 | 109 | S.M.R. #5  R50 |
| Starting Circuit Conditioning Circuit | 111 | S.L.R. #1  R51 | 113 | S.L.R. #2  R11 | 115 | S.L.R. #3  R21 | 117 | S.L.R. #4  R31 | 119 | S.L.R. #5  R41 |
| Motor Control Stopping Circuit | 131 | T.M.R. #1  R13 | 133 | T.M.R. #2  R23 | 135 | T.M.R. #3  R33 | 137 | T.M.R. #4  R43 | 139 | T.M.R. #5  R53 |
| Stopping Circuit Conditioning Circuit | 121 | T.L.R. #1  R12 | 123 | T.L.R. #2  R22 | 125 | T.L.R. #3  R32 | 127 | T.L.R. #4  R42 | 129 | T.L.R. #5  R52 |

As the various circuits associated with each motor are identical, except for the No. 1 motor starting circuit 101, only the circuits associated with motor No. 2 will be specifically described. The No. 2 motor starting circuit conditioning circuit 113 has an output that is coupled to an input of the No. 2 motor control starting circuit 103. The No. 2 motor control stopping circuit conditioning circuit 123 has an output that is coupled to an input of a No. 2 motor control stopping circuit 133 and to an input of the No. 1 motor stopping circuit conditioning circuit 121. The No. 2 motor control stopping circuit 133 has an output that is coupled to an input of the No. 2 motor control starting circuit 103 and to an input of the No. 2 motor starting circuit conditioning 137 and 139 basically serve to stop the respective motors by disabling the starting circuits associated with the motors as well as their respective conditioning circuits. To particularly illustrate the stopping and starting sequence, assume that No. 1 and No. 2 motors were started in the order mentioned. As a result of the No. 1 motor being energized by the response of No. 1 motor starting circuit 101 to a start signal development, the No. 1 motor stopping circuit conditioning circuit 121 was energized to condition the No. 1 motor stopping circuit for response to the next stopping signal. Similarly, as a result of the No. 2 motor being energized by the response of the No. 2 motor starting circuit 103 to the next start signal development, the No. 2 motor starting circuit conditioning circuit 123 was enabled but only partially conditioned and thus not energized, the circuit 123 being instead still disabled by the No. 1 motor starting circuit 101. Accordingly, at this point, only the No. 1 motor control stopping circuit 131 is conditioned for response to the next stopped signal. As such, the condition of No. 1 motor control stopping circuit 131 will be energized by the next stop signal development and cause the No. 1 motor starting circuit conditioning circuit 111 and its starting circuit to be deenergized. As a result of the No. 1 motor control starting circuit 101 being de-energized, the No. 2 motor stopping circuit conditioning circuit 123 becomes de-energized and thereby enables and conditions the No. 2 motor stopping circuit 133 for response to the next stop signal, the No. 2 motor stopping circuit 133 will be energized. This will cause the No. 2 motor stopping circuit 133 and stopping circuit conditioning circuit 123 to be de-energized and thus stop motor No. 2. As such, motors Nos. 1 and 2 are stopped in the same order that they were energized or started.

To be more specific, and again only considering the operation of the No. 2 motor circuits, the No. 2 motor control starting circuit 103 can be energized by response to a start signal development, but only when the No. 2 motor starting circuit condition circuit 113 is energized to thus condition the No. 1 motor starting circuit for such response. Furthermore, the No. 2 motor starting circuit can be de-energized in response to a stop signal development but only when the No. 2 motor stopping circuit conditioning circuit 113 is energized to condition the No. 2 motor control stopping circuit for such response to the stop signal.

The No. 2 motor starting circuit conditioning circuit 113 has an energized and de-energized state. In order to energize the circuit 113 by response to an absence of the start signal, the No. 2 motor starting circuit 103 must be de-energized and the No. 1 motor starting circuit 101 and its conditioning circuit 111 must be energized at the time the circuit 113 responds to the absence of the start signal. On the other hand, to de-energize the circuit 113 in response to the next stop signal, the No. 2 motor starting circuit conditioning circuit 123 must be energized and the No. 2 motor starting circuit 133 conditioned thereby for response to the next stop signal.

The No. 2 motor control stopping circuit 133 also has an energized and de-energized state. In order to energize the circuit 133 in response to the next stop signal development, it must be conditioned for such response by an energized No. 2 motor starting circuit conditioning circuit 123.

The No. 2 stopping circuit conditioning circuit 123 also has energized and de-energized states. In order for the circuit 123 to respond to the absence of the stop signal and become energized, the No. 2 motor starting circuit 103 must be energized and the starting circuit associated with the next preceding motor in the cyclic order must be de-energized, and thus, the No. 1 motor starting circuit 101 and its conditioning circuit 111 must be de-energized. In order for the No. 2 stopping circuit conditioning circuit 123 to become de-energized in response to the next absence of the stop signal, the No. 2 motor starting circuit 103 must be de-energized and the next motor in the cyclic order must be energized and thus the No. 3 motor starting circuit 105 and its conditioning circuit 115 must be energized.

The logic circuitry of FIG. 4 utilizes symbols for decision elements including "and", "or" and "not" or "inverter" logic circuits. The "and" and "or" circuits combine signals according to well known rules and the logic components that store information include flip-flops that are in either of two stable states. One state may be represented by the presence of a signal such as a positive going pulse and referred to as a "one" state and the other state may be represented by the absence of a signal of the pulse and referred to as a "zero" state. Accordingly, a binary component which is energized develops a "one" state output and when de-energized, develops a "zero" state output. Relays utilized in the illustrated embodiment of the invention are, of course, bistable components and are represented as flip-flops in FIG. 4. Thus when the relay or flip-flop is energized it provides a "one" state output and when de-energized provides a "zero" state output. The outputs of the various relays are delivered as inputs to the various circuit components and in FIG. 4 such inputs are designated by the relay source. For example, the output signal from relay R20 is referred to as R20 at the input of a circuit component.

The motor control starting circuits 101, 103, 105, 107 and 109 for their respective motors include relay latching or sealing circuit branches that have respective "and" circuits 151, 153, 155, 157 and 159. The starting circuits also includes response circuit branches that have respective "and" circuits 161, 163, 165, 167 and 169 and respective "or" circuits 171, 173, 175, 177 and 179. The starting circuit conditioning circuits 111, 113, 115, 117 and 119 include relay latching or sealing circuits that have respective "and" circuits 181, 183, 185, 187 and 189. The conditioning circuits also include response circuit branches that have respective "and" circuits 191, 193, 195, 197 and 199 and respective "or" circuits 201, 203, 205, 207 and 209. The motor control stopping circuits 131, 133, 135, 137 and 139 for the respective motors have respective "and" circuits designated at 211, 213, 215, 217 and 219. The stopping circuit conditioning circuits 121, 123, 125, 127 and 129 for the respective motors also include latching or sealing branch circuits that include respective "and" circuits 221, 223, 225, 227 and 229. These conditioning circuits also have response branches that include respective "and" circuits 231, 233, 235, 237 and 239 and respective "or" circuits 241, 243, 245, 247 and 249.

The circuit components associated with each motor will be best evidenced by an initial consideration of those circuit components associated with motor No. 2.

The No. 2 motor starting circuit 103 includes a flip-flop or motor starting component S.M.R. #2, a two input "and" circuit 153, a two input "or" circuit 173 and another two input "and" circuit 163. One input of "and" circuit 153 is coupled through an inverter to the output of the No. 2 motor stopping circuit T.M.R. #2 and the other input of "and" circuit 153 is coupled to the output of the No. 2 motor starting component S.M.R. #2. The output of "and" state 153 is coupled through "or" circuit 173 to the input of the No. 2 motor starting component S.M.R. #2. The output of the other "and" state 163 is also coupled through "or" circuit 173 to the input of the No. 2 motor starting component S.M.R. #2. One input of "and" state 163 is coupled to an output of the No. 2 motor starting circuit conditioning component S.L.R. #2 and the other input of the gate 163 is coupled over Line A to the output of the master starting control component RA.

The No. 2 motor starting circuit conditioning circuit 113 comprises a flip-flop or motor starting circuit conditioning component S.L.R. #2, a two input "and" circuit 183, a two input "or" circuit 203 and a three input "and" gate 193. One input of "and" circuit 183 is coupled through an inverter to the output of the No. 2 motor stopping component T.M.R. #2 while the other input of the "and" circuit is coupled to an output of the No. 2 motor starting circuit conditioning component S.L.R. #2. The output of gate 183 is coupled through "or" gate 203 to the input of the No. 2 motor starting circuit conditioning component S.L.R. #2. The output of "and" gate 193 is also coupled through "or" circuit 203 to the input of the No. 2 motor starting circuit conditioning component S.L.R. #2. One input of "and" gate 193 is coupled through an inverter to an output of the No. 2 motor starting circuit conditioning component S.M.R. #2 and a second input is coupled to an output of the No. 1 motor starting component S.M.R. #1. The third input of "and" gate 193 is coupled through an inverter and over Line A to the output of the master starting control component RA.

The No. 2 motor stopping circuit 133 comprises a flip-flop or motor stopping component T.M.R. #2 and a two input "and" gate 213. The output of "and" gate 213 is coupled to the input of the motor stopping component T.M.R. #2 while a first input of the gate is coupled to an output of the No. 2 starting circuit conditioning component T.L.R. #2. The second input of "and" circuit 213 is coupled over Line B to the output of the master stopping control component RB.

The No. 2 motor stopping circuit conditioning circuit 123 comprises a flip-flop or motor stopping circuit conditioning component T.L.R. #2, a two input "and" gate 223, a two input "or" gate 243 and a three input "and" circuit 233. One input of "and" circuit 223 is coupled through an inverter to the output of the No. 3 motor stopping circuit conditioning component T.L.R. #3 while the second input of the gate is coupled to an output of the No. 2 motor stopping circuit conditioning component T.L.R. #2. The output of gate 223 is coupled through "or" gate 243 to the input of the No. 2 motor stopping circuit conditioning component T.L.R. #2. The output of "and" gate 233 is also coupled to the input of the No. 2 motor stopping circuit conditioning component T.L.R. #2 through "or" gate 243. One input of "and" gate 233 is coupled through an output of the No. 2 motor starting component S.M.R. #2 while another input is coupled through an inverter to an output of the No. 1 motor starting component S.M.R. #1. The third input of gate 233 is coupled through an inverter and over Line B to the output of the master stopping control component RB.

The response branch of the No. 1 motor starting circuit conditioning circuit 101 in addition to the "or" circuit and two "and" circuits that are found in the other motor starting circuits also has an additional "and" circuit 251 and an additional "or" circuit 253. Circuit 251 has four inputs, one input being coupled through an inverter to the output of the No. 2 motor starting circuit conditioning component S.L.R. #2, a second output being coupled through an inverter to the output of the No. 3 motor starting circuit conditioning circuit S.L.R. #3, a third output being coupled through an inverter to the No. 4 motor starting circuit conditioning component S.L.R. #4 and the fourth output being coupled through an inverter to the No. 5 motor starting circuit conditioning component S.L.R. #5. The output of the "and" gate 251 is coupled to one inpout of the two input "or" gate 253 and the other input of "or" gate 253 is coupled to the output of the No. 1 motor starting circuit conditioning component S.L.R. #1, while the output of the "or" gate 253 is coupled to one input of "and" gate 161.

To illustrate the operation of the system depicted in FIG. 4 it may be assumed that all five motors have been sequentially started and stopped and have gone through a full starting cycle and a full stopping cycle with Motor No. 1 being the first motor that was started and the first motor stopped while the No. 5 motor was the last motor started and last motor stopped. Under such circumstances the No. 1 motor starting circuit conditioning component S.L.R. #1 will be energized and develop a "one" state output that along Line c and through gate 253 serves to condition the response gate 161 of the No. 1 motor starting circuit 101 for response to the next "one" state development by the master starting control component RA. At the same time, the No. 5 motor starting component S.M.R. #5 is de-energized and the master stopping control component RB is assumed to be developing a "zero" state so that the response gate 231 of the No. 1 motor stopping circuit conditioning circuit 121 is conditioned for response to a "one" state development by the No. 1 motor starting component S.M.R. #1. As such, when the master starting control component RA next develops the "one" state, gate 161 develops an output which through "or" gate 171 energizes the No. 1 motor starting component S.M.R. #1. This energizes the No. 1 motor and conditions the response gate circuit 193 of the No. 2 motor starting circuit conditioning circuit 113 for response to the next "zero" state development by the master starting control component RA. When the No. 1 motor starting component S.M.R. #1 is energized, the already conditioned latching "and" circuit 151 develops an output which through "or" gate 171 serves to maintain the energized condition of the No. 1 motor starting component S.M.R. #1. In the stopping circuitry, the energizing of the No. 1 motor starting component provides an output that causes the conditioned response gate 231 of the No. 1 motor stopping circuit conditioning circuit 121 to in turn develop an output which through "or" gate 241 serves to energize the No. 1 motor stopping circuit conditioning component T.L.R. #1 and thereby condition the response gate 211 of the No. 1 motor stopping circuit 131 for response to the next "one" state development by the master stopping control component RB. Simultaneously, the output from the No. 1 motor starting component S.M.R. #1 disables the response gate 233 of the No. 2 motor stopping circuit conditioning circuit 123. Simultaneously, the response gate 191 of the No. 1 motor starting circuit conditioning circuit 111 is also disabled.

At this point, the No. 1 motor starting component S.M.R. #1, the No. 1 motor starting circuit conditioning component S.L.R. #1 and the No. 1 motor stopping circuit conditioning component T.L.R. #1 are energized, and the response "and" gate circuit 193 of the No. 2 motor starting circuit conditioning circuit is conditioned for response to a "zero" state development by the master starting control component RA while the response gate circuit 211 of the No. 1 motor stopping circuit 131 is conditioned for response to the next "one" state development by the master stopping control component RB. As such, when the master starting control component RA next develops the "zero" state, gate 193 responds and develops an output which through "or" gate 203 serves to energize the No. 2 motor starting circuit conditioning component S.L.R. #2. When this happens, the conditioned latching "and" gate 183 is energized and provides an output which through "or" gate 203 serves to maintain the energized condition of the No. 2 motor starting circuit conditioning component S.L.R. #2. Simultaneously, the response "and" gate 163 of the No. 2 motor starting circuit is conditioned for response to the next "one" state development by the master starting control relay RA and the bypass gate circuit 251 is disabled.

At this point, the No. 1 motor starting component S.M.R. #1, the No. 1 motor starting circuit conditioning component S.L.R. #1, the No. 1 motor stopping circuit conditioning component T.L.R. #1 and the No. 2 motor starting circuit conditioning component S.L.R. #2 are energized, and the response gate 163 of the No. 2 motor starting circuit 103 is conditioned for response to the next "one" state development by the master starting control component RA while the response gate 211 of the No. 1 motor stopping circuit 131 is conditioned for response to the next "one" state development by the master stopping control component RB. As such, with the next "one" state development by the master starting control component, the conditioned gate circuit 163 is energized and develops an output which through "or" gate 173 serves to energize the No. 2 motor starting component S.M.R. #2. This energizes the conditioned latching gate 153 and develops an output which through "or" gate 173 serves to maintain the energized condition of the No. 2 motor starting component S.M.R. #2. Simultaneously, the response gate of the No. 3 motor starting circuit conditioning circuit 115 is enabled and with the cooperation of the output from the No. 3 motor starting circuit S.M.R. #3 is conditioned for response to the next "zero" state development by the master starting control component RA while the response gate of the No. 2 motor starting circuit conditioning circuit is disabled. In the stopping circuitry portion of the system, the response gate 233 of the No. 2 motor stopping circuit conditioning circuit 123 is enabled and partially conditioned while the response gate 235 of the No. 3 motor stopping circuit conditioning circuit 125 is disabled.

At this point, the No. 1 motor starting component S.M.R. #1, the No. 1 motor starting circuit conditioning component S.L.R. #1, the No. 1 motor stopping circuit conditioning component T.L.R. #1, the No. 2 motor starting circuit conditioning component S.L.R. #2 and the No. 2 motor starting component S.M.R. #2 are energized and the response gate 211 of the No. 1 motor stopping circuit 131 is conditioned for response to the next "one" state development by the master stopping control component RB while the response gate 195 of the No. 3 motor starting circuit conditioning circuit 115 is conditioned for response to the next "zero" state development by the master starting control component RA. As such, with the next "zero" state development by the control component RA, the response gate 195 of the No. 3 motor starting circuit conditioning circuit 115 responds and provides an output which through "or" 205 serves to energize the No. 3 motor starting circuit conditioning component S.L.R. #3. When this happens, the conditioned "and" gate 185 responds and provides an output which through "or" gate 205 serves to maintain the energized condition of the No. 3 motor starting circuit conditioning component S.L.R. #3. Simultaneously, gate 251 is further disabled and the response gate circuit 165 of the No. 3 motor starting circuit 105 is conditioned for response to the next "one" state development by the master starting control component RA.

At this point, the No. 1 motor starting circuit conditioning component S.M.R. #1, the No. 1 motor starting component S.L.R. #1, the No. 1 motor starting circuit conditioning component T.L.R. #1, the No. 2 motor starting circuit conditioning component S.L.R. #2, the No. 2 motor starting component S.M.R. #2 and the No. 3 motor starting circuit conditioning component S.L.R. #3 are energized and the response gate 211 of the No. 1 motor stopping circuit is conditioned for response to the next "one" state development by the master stopping control component RB while the response gate 165 of the No. 3 motor starting circuit 105 is conditioned for response to the next "one" state development by the master starting control component RA. As such, with the next "one" state development by the master starting control component RA, gate 165 is energized and through "or" gate 175 energizes the No. 3 motor starting component S.M.R. #3. This provides a "one" state at the input of the conditioned latching "and" circuit 155 and provides an output which through gate 175 serves to maintain the energized condition of the No. 3 motor starting component S.M.R. #3. Simultaneously, a gate disabling "zero" state is impressed on one input of the response gate 195 of the No. 3 motor starting circuit conditioning circuit 115 and the response gate 197 of the No. 4 motor starting circuit conditioning circuit 117 is provided with an enabling "one" state development which with the "one" state output of the No. 4 motor starting component S.M.R. #4, conditions the gate for response to the next "zero" state development by the master starting control component RA. In the stopping circuitry, the energizing of the No. 3 motor starting component S.M.R. #3 provides a "one" state output that enables and partially conditions the three input gate 235 of the No. 3 motor stopping circuit conditioning circuit 125 for response to an output via component RB and simultaneously disables the response gate 237 of the No. 4 motor stopping circuit conditioning circuit 127.

At this point the No. 1 motor starting circuit conditioning component S.L.R. #1, the No. 1 motor starting component S.M.R. #1, the No. 1 motor stopping circuit conditioning component T.L.R. #1, the No. 2 motor starting circuit conditioning component S.L.R. #2, the No. 2 motor starting component S.M.R. #2, the No. 3 motor starting circuit conditioning component S.L.R. #3 and the No. 3 motor starting component S.M.R. #3 are energized and gate 211 of the No. 1 motor stopping circuit 131 is conditioned for response to the next "one" state output by the master stopping control component RB while the response gate 197 of the No. 4 motor starting circuit conditioning circuit 117 is conditioned for response to the next "zero" state development by the master starting control component RA. As such, when the master starting control component develops the next "zero" state response, gate 197 develops an output which through "or" gate 207 energizes the No. 4 motor starting circuit conditioning component S.L.R. #4. Upon being energized, the No. 4 motor starting circuit conditioning component S.L.R. #4 develops an output that further disables "and" gate 251 and which also energizes the latching gate 187. This provides an output which through "or" gate 207 serves to maintain the energized condition of the No. 4 motor starting circuit conditioning component S.L.R. #4. The response of component S.L.R. #4 also provides a gate enabling "one" state input at the response gate 167 of the No. 4 motor starting circuit 107 and which conditions the gate circuit 167 for response to the next "one" state development by the master starting control component RA.

At this point the No. 1 motor starting circuit conditioning component S.L.R. #1, the No. 1 motor starting component S.M.R. #1, the No. 1 motor stopping circuit conditioning component T.L.R. #1, the No. 2 motor starting circuit conditioning component S.L.R. #2, the No. 2 motor starting component S.M.R. #2, the No. 3 motor starting circuit conditioning component S.L.R. #3, the No. 3 motor starting component S.M.R. #3 and the No. 4 motor starting circuit conditioning component S.L.R. #4 are energized and response gate 211 of the No. 1 motor starting circuit 131 is conditioned for response to the next positive going or "one" state development by the master stopping control component RB while response gate 167 of the No. 4 motor starting circuit 107 is conditioned for response to the next "one" state development by the master control component RA.

With the foregoing circuit condition in mind, if the master stopping control component RB now develops a "one" state, the response gate 211 of the No. 1 motor stopping circuit 131 develops an output which energizes the No. 1 motor stopping component T.M.R. #1. When this happens, the component develops an output which disables the latching gate 151 of the No. 1 motor starting circuit 101 to thereby de-energize the No. 1 motor starting component S.M.R. #1. Simultaneously, the circuit output disables the latching gate 181 of the No. 1 motor starting circuit conditioning circuit and which through "or" gate 201 serves to de-energize the No. 1 motor starting circuit conditioning component S.L.R. #1.

When the No. 1 motor starting circuit conditioning component S.L.R. #1 is de-energized, the component provides a "zero" state output which through "or" gate 253 serves to disable the response gate 161 of the No. 1 motor starting circuit. Simultaneously, the output from the No. 4 motor starting circuit conditioning component S.L.R. #4 disables the response gate 167 of the No. 4 motor starting circuit 107.

When the No. 1 motor starting component S.M.R. #1 is de-energized, it provides a gate disabling "zero" state output to one input of the response gate 193 of the No. 2 motor starting circuit conditioning circuit 113 and in the stopping circuitry, provides a gate disabling "zero" output to the response gate 231 of the No. 1 motor starting circuit conditioning circuit 121 and through an inverter provides an enabling "one" state development to the response gate 233 of the No. 2 motor stopping circuit conditioning circuit 123. This in conjunction with the "one" state output provided by the No. 2 motor starting component serves to condition the response gate 233 for response to the next "zero" state development by the master stopping control component RB.

At this point, the No. 1 motor stopping circuit conditioning component T.L.R. #1, the No. 1 motor stopping component T.M.R. #1, the No. 2 motor starting circuit conditioning component S.L.R. #2, the No. 2 motor starting component S.M.R. #2, the No. 3 motor starting circuit conditioning component S.L.R. #3, the No. 3 motor starting component S.M.R. #3 and the No. 4 motor starting circuit conditioning component S.L.R. #4 are energized and the response gate 167 of the No. 4 motor starting circuit 107 is conditioned for response to the next "one" state development by the master starting control component RA while the response gate of the No. 2 motor starting circuit conditioning circuit 123 is conditioned for response to the next state development by the master stopping control component RB. As such, with the next "zero" state development by the master stopping control component RB, the response gate 233 of the No. 2 motor stopping circuit conditioning circuit 123 develops an output which through "or" gate 243 serves to energize the No. 2 motor starting circuit conditioning component T.L.R. #2. When this happens, the No. 2 motor starting circuit conditioning component T.L.R. #2 provides a gate enabling output to one input of the response gate 213 of the No. 2 motor stopping circuit 133 and which conditions the gate 213 for response to the next "one" state development by the master stopping control component RB. Simultaneously, the No. 2 motor starting circuit conditioning component T.L.R. #2 provides a "one" state development to the input of the conditioned latching gate 223 and which in response provides an output through "or" gate 243 which serves to maintain the energized condition of the component T.L.R. #2. Simultaneously, component T.L.R. #3 provides an output which through an inverter serves to disable gate 221 of the No. 1 motor stopping circuit conditioning circuit 121 and thereby de-energize the No. 1 motor starting circuit conditioning component T.L.R. #1. When this happens, component T.L.R. #1 provides an output which disables the latching gate 229 of the No. 5 motor starting circuit conditioning circuit 129. When the "zero" state was developed by the master stopping control component RB, the response gate 211 of the No. 1 motor starting circuit 131 was disabled. When this happened, component T.M.R. #1 was de-energized and provided an output which through inverters served to condition the latching "and" gate 151 of the No. 1 motor starting circuit 101 and the latching gate 181 of the No. 1 motor starting circuit conditioning circuit 111.

At this time the No. 2 motor starting circuit conditioning component S.L.R. #2, the No. 2 motor starting component S.M.R. #2, the No. 2 motor stopping circuit conditioning component T.L.R. #2, the No. 3 motor starting circuit conditioning component S.L.R. #3, the No. 3 starting component S.M.R. #3 and the No. 4 starting circuit conditioning component S.L.R. #4 are energized and the response gate 167 of the No. 4 motor starting circuit 107 is conditioned for response to the next "one" state development by the master starting control component RA while the response gate 213 of the No. 2 motor starting circuit 133 is conditioned for response to the next "one" state development by the master stopping control relay RB. As such, when the next "one" state is developed by the master stopping control relay RB, the response gate 213 of the No. 2 motor starting circuit 133 develops an output which energizes the No. 2 motor stopping component T.M.R. #2. This provides a circuit enabling "zero" state through inverters through each of the latching gates 183 and 153 so that the No. 2 motor starting component S.M.R. #2 and the No. 2 motor starting circuit conditioning component S.L.R. #2 are de-energized. When the No. 2 motor starting circuit conditioning component S.L.R. #2 is de-energized, the response gate of the No. 2 motor starting circuit 103 is disabled and the "and" gate 251 is further enabled. When the No. 2 motor starting circuit 103 is disabled, the response gate 193 of the No. 2 motor starting circuit conditioning circuit 113 is enabled, the response gate 195 of the No. 3 motor starting circuit conditioning circuit 115 is disabled, the response gate 233 of the No. 2 motor stopping circuit conditioning circuit 123 is disabled and the response gate 235 of the No. 3 motor stopping circuit conditioning circuit 125 is enabled and in cooperation with the output from the No. 3 motor starting component S.M.R. #3 conditioned for response to the next "zero" state development by the master stopping control component RB.

At this point the No. 2 motor stopping component T.M.R. #2, the No. 3 motor starting circuit conditioning component S.L.R. #3, the No. 3 motor starting component S.M.R. #3 and the No. 4 motor starting conditioning component S.L.R. #4 are energized and gate 167 of the No. 4 motor starting circuit 107 is conditioned for response to the next "one" state development by the master starting control component RA while the response gate 235 of the No. 3 motor starting circuit conditioning circuit 125 is conditioned for response to the next "zero" state development by the master stopping control component RB. As such, when the next "zero" state development by the master control stopping component RB, gate 235 develops an output which through "or" gate 245 serves to energize the No. 3 motor stopping circuit conditioning component T.L.R. #3. When this happens, the latching gate 225 is energized and develops an output which through "or" gate 245 serves to maintain the energized condition of component T.L.R. #3. Simultaneously, gate 215 of the No. 3 motor stopping circuit 135 is conditioned for response to the next "one" state development by the master stopping control component RB and the latching gate 223 of the No. 2 motor stopping circuit conditioning circuit 123 is disabled to thereby de-energize the No. 2 motor stopping circuit conditioning component T.L.R. #2. When the master stopping control component RB develops the "zero" state, the response gate 213 of the No. 2 motor stopping circuit was disabled and thereby de-energized the No. 2 motor stopping component T.M.R. #2. When this happened, the output of component T.M.R. #2 enabled and conditioned the latching circuits 183 and 153 of the No. 2 motor starting circuit 103 and the No. 2 motor starting circuit conditioning circuit 113.

At this time the No. 3 motor starting circuit conditioning component S.L.R. #3, the No. 3 motor starting component S.M.R. #3, the No. 3 motor starting circuit conditioning component T.L.R. #3, and the No. 4 motor starting circuit conditioning component S.L.R. #4 are energized and the response gate 167 of the No. 4 motor starting circuit 107 is conditioned for response to the next "one" state development by the master starting control component RA while the response gate 215 of the No. 3 motor stopping circuit 135 is conditioned for response to the next "one" state development by the master stopping control component RB. As such, the master stopping control component RB now develops a "one" state, response gate 215 will provide a circuit energizing input to the No. 3 motor stopping component T.M.R. #3. When this happens, component T.M.R. #3 provides an output which through inverters serve to disable the latching "and" gate 185 and 155 and thereby de-energize the No. 3 motor starting circuit conditioning component S.L.R. #3 and the No. 3 motor starting component S.M.R. #3. When the No. 3 motor starting circuit conditioning component S.L.R. #3 is de-energized, gate 251 is further enabled and the response gate 165 of the No. 3 motor starting circuit 105 is disabled. When the No. 3 motor starting component S.M.R. #3 is de-energized, the response gate 195 is enabled and partially conditioned, the response gate 195 of the No. 4 motor starting circuit conditioning circuit 117 is disabled, the response gate 235 of the No. 3 motor stopping circuit conditioning circuit 125 is disabled and the response gate 237 of the No. 4 motor stopping circuit conditioning circuit 127 is enabled and partially conditioned for response when the No. 4 motor is next energized.

At this point the No. 3 motor stopping circuit conditioning component T.L.R. #3, the No. 3 motor stopping component T.M.R. #3, and the No. 4 motor starting circuit conditioning component S.L.R. #4 are energized and response gate 167 of the No. 4 motor starting circuit 107 is conditioned for response to the next "one" state development by the master starting control component RA. As such, when the master stopping component RB next develops a "zero" state, the response gate 215 is disabled and this de-energizes the No. 3 motor stopping component T.M.R. #3 and which in turn enables the latching gates 185 and 155 for the No. 3 motor starting circuit conditioning circuit 115 and No. 3 motor starting circuit 105.

At this point in time all motors have been de-energized in the same order in which they were energized and the No. 4 motor starting circuit conditioning component S.L.R. #4 is energized so that response gate 167 is conditioned for response to the next "one" state development by the master starting control component RA and which will reflect the demand for an energized motor. On the stopping circuitry side, the No. 3 motor stopping circuit conditioning component T.L.R. #3 remains energized and the response gate 237 of the No. 4 motor stopping circuit conditioning circuit 127 is conditioned to respond when the No. 4 motor starting component S.M.R. #4 is energized and thereby conditions the response gate 217 of the No. 4 motor starting circuit for response tothe next "one" state development by the master stopping control component RB.

As such, when the next "one" state is developed by the master starting control component RA, response circuit 167 of the No. 4 motor starting circuit 107 is energized and provides an output through "or" gate 177 which energizes the No. 4 motor starting component S.M.R. #4. When this happens the latching gate 157 is energized and provides an output through "or" gate 177 which serves to maintain the energized condition of component S.M.R. #4. Simultaneously, "and" gate 199 is conditioned for response to the next "one" state development by the master starting control component RA and the response gate 197 of the No. 4 motor starting circuit conditioning circuit 117 is disabled. In the stopping circuitry, response gate 237 is energized when component S.M.R. #4 is energized and thereby provides an output which through "or" gate 247 serves to energize the No. 4 motor starting circuit conditioning component T.L.R. #4. When this happens, response gate 217 of the No. 4 motor starting circuit 137 is conditioned for response to the next "one" state development by the master stopping control component RB and the latching circuit 225 of the No. 3 motor starting circuit conditioning circuit 125 is disabled and thereby disabling the No. 3 motor starting circuit conditioning component T.L.R. #3.

Thereafter successive "one" state developments by the master starting control component RA will sequentially energize additional motors, motors Nos. 5, 1, 2, and 3 being started in that order and sequentially in response to successive developments of the "one" states by the master control starting component. When all five motors are turned on, or all five motors are turned off, a cycle is completed regardless of which motor the cycle begins with. For example, such five motors would start after all have been stopped, assuming motor No. 2 was the first motor to be started in the cycle, in the following identical three full cycles or series of progressionals;

2, 3, 4, 5, 1
2, 3, 4, 5, 1
2, 3, 4, 5, 1

While only certain preferred embodiments of this invention have been described by way of illustration, many modifications will occur to those skilled in the art including those resulting from logic simplification and it is, therefore, desired that it be understood, that it is intended herein to cover all such modifications as fall within the true spirit and scope of this invention.

What is claimed as new and what it is desired to secure by Letters Patent of the United States is:

1. A system for controlling a plurality of motors comprising starting circuitry for sequentially starting said motors in accord with a predetermined cyclic motor order, and stopping circuitry for sequentially stopping said motors in accord with said cyclic motor order; said starting circuitry comprising a master starting control circuit for respectively developing first and second states in response to the sensed presence and absence of a predetermined first condition, a plurality of motor control starting circuits which are coupled to and operate under the control of said master starting control circuit for starting the respective motors, and a plurality of starting circuit conditioning circuits which are coupled to and for conditioning the respective motor control starting circuits to respond sequentially to successive developments of said first state, said starting circuit conditioning circuits being coupled to said master starting control circuit and operating under the control thereof to respond to second state developments by said master starting control circuit; and said stopping circuitry comprising a master stopping control circuit for respectively developing third and fourth states in response to the sensed presence and absence of a predetermined second condition, a plurality of motor control stopping circuits which are coupled to and operate under the control of said master stopping control circuit for stopping the respective motors, and a plurality of stopping circuit conditioning circuits which are coupled to and for conditioning the respective motor control stopping circuits to respond sequentially to successive developments of said third state, said stopping circuit conditioning circuits being coupled to said master stopping control circuit and operating under the control thereof to respond to fourth state developments by said master stopping control circuit.

2. A system for controlling a plurality of motors in accord with claim 1 wherein said master starting control circuit comprises first sensing means for sensing the presence and absence of said first condition, first master control means which is coupled to said first sensing means for respectively developing said first and second states in response to the sensed presence and absence of said first condition thereby, and first timing means for controlling said first master control means to develop its second state for a limited time interval during a prolonged sensed presence of said first condition and which is coupled to said first master control means to respond after the development of said first state for a predetermined time period; each one of said motors is associated with a respect one of said motor control starting circuits, and a respective one of said starting circuit conditioning circuits; said one motor control starting circuit comprises first relay means for energizing said one motor, and first circuit means which is coupled to said first relay means and said first master control means for energizing said first relay means; said one starting circuit conditioning circuit comprises second relay means which is coupled to said first circuit means for conditioning said first circuit means for response to a first state development by said first master control means, and second circuit means which is coupled to said second relay means and said first master control means for energizing said second relay means, said second circuit means being conditioned for response to a second state development by said first master control means when said one motor is de-energized and the motor next preceding said one motor in said cyclic order is energized and comprising means coupled to said first relay means for enabling and disabling said second circuit means when said first relay means is respectively de-energized and energized, and means coupled to the first relay means of the motor control starting circuit associated with said next preceding motor for enabling and disabling said second circuit means when the first relay means of the motor control starting circuit associated with said next preceding motor is respectively energized and de-energized.

3. A system for controlling a plurality of motors in accord with claim 2 wherein said master stopping control circuit comprises second sensing means for sensing the presence and absence of said second condition, second master control means which is coupled to said second sensing means for respectively developing said third and fourth states in response to the sensed presence and absence of said second condition thereby, and second timing means for controlling said second master control means to develop its fourth state for a limited time interval during a prolonged sensed presence of said third condition and which is coupled to said second master control means to respond after the development of said third state for a predetermined time period; said one motor is associated with a respective one of said motor control stopping circuits, and a respective one of said stopping circuit conditioning circuits; said one more control stopping circuit is coupled to said second master control means and comprises third relay means which is coupled to said one motor control starting circuit and said one starting circuit conditioning circuit for de-energizing said second relay means and the first relay means of said one motor control starting circuit; and said one stopping circuit conditioning circuit comprises fourth relay means which is coupled to said one motor control stopping circuit for conditioning said one motor control stopping circuit for response to a third state development by said second master control means, and third circuit means which is coupled to said fourth relay means and said second master control means for energizing said fourth relay means, said third circuit means being conditioned for response to a fourth state development by said second master control means when said one motor is energized and said next preceding motor is de-energized and comprising means coupled to the first relay means of said one motor control starting circuit for enabling and disabling said third circuit means when the first relay means of said one motor control starting circuit is respectively energized and de-energized, and means coupled to the first relay means of the motor control starting circuit associated with said next preceding motor for enabling and disabling said third circuit means when the first relay means of the motor control starting circuit associated with said next preceding motor is respectively de-energized and energized.

4. A system for controlling a plurality of motors in accord with claim 3 wherein said one motor control starting circuit comprises fourth circuit means for maintaining the energized condition of the first relay means of said one motor control starting circuit and which is coupled to the first relay means of said one motor control starting circuit for response when the first relay means of said one motor control starting circuit is energized; said one starting circuit conditioning circuit comprises fifth circuit means for maintaining the energized condition of said second relay means and which is coupled to said second relay means for response when it is energized; said one stopping circuit conditioning circuit comprises sixth circuit means for maintaining the energized condition of said fourth relay means and which is coupled to said fourth relay means for response when it is energized; and said sixth circuit means comprises means for disabling the sixth circuit means and which is coupled to the fourth relay means of the stopping circuit conditioning circuit associated with the motor next succeeding said one motor in said cyclic order for response when the fourth relay means of the stopping circuit conditioning circuit associated with said next succeeding motor is energized.

5. A system for controlling a plurality of motors in accord with claim 1 wherein each one of said motors is associated with a respective one of said motor control starting circuits, and a respective one of said starting circuit conditioning circuits; said one motor control starting circuit comprises a first component for energizing said one motor, first "and" circuit means with an output that is coupled to said first component for energizing said first component and which has a first input that is coupled to said master starting control circuit, and a second input; and said one starting circuit conditioning circuit comprises second components with an output that is coupled to said second input for conditioning said first "and" circuit means to respond to a first state development by said master starting control circuit, second "and" circuit means with an output that is coupled to said second component for energizing said second component, said second "and" circuit means being conditioned for response to a second state development by said master starting control circuit when said one motor is de-energized and the motor next preceding said one motor in said cyclic order is energized and having a first input that is coupled to said master starting circuit, a second input that is coupled to an output of said first component for enabling and disabling said second "and" circuit means when said first component is respectively de-energized and energized, and a third input that is coupled to an output of the first component of the motor control starting circuit associated with said next preceding motor for enabling and disabling said second "and" circuit means when the first component of the motor control starting circuit of said next preceding motor is respectively energized and de-energized.

6. A system for controlling a plurality of motors in accord with claim 5 wherein said one motor is associated with a respective one of said motor control stopping circuits and a respective one of said stopping circuit conditioning circuits; said one motor control stopping circuit comprises third components with an output that is coupled to said one motor control starting circuit and said one starting circuit conditioning circuit for de-energizing said second component and the first component of said one motor control starting circuit, third "and" circuit means with an output that is coupled to said third component for energizing said third component and which has a first input that is coupled to said master stopping control circuit, and a second input; and said one stopping circuit conditioning circuit comprises fourth components with an output that is coupled to the second output of said third "and" circuit means for conditioning said third "and" circuit means to respond to a third state development by said master stopping control circuit, and fourth "and" circuit means with an output that is coupled to said fourth component for energizing said fourth component, said fourth "and" circuit means being conditioned for response to a fourth state development by said master stopping control circuit when said one motor is energized and said next preceding motor is de-energized and having a first input that is coupled to said master stopping control circuit, a second input that is coupled to an output of said first component for enabling and disabling said second "and" circuit means when said first component is respectively energized and de-energized, and a third input that is coupled to an output of the first component of the motor control starting circuit of said next preceding motor for enabling and disabling said second "and" circuit means when the first component of the motor control starting circuit of said next preceding motor is respectively de-energized and energized.

7. A system for controlling a plurality of motors in accord with claim 6 wherein said one motor control starting circuit comprises fifth "and" circuit means with an output that is coupled to said first component for maintaining the energized condition of said first component, said fifth "and" circuit means being responsive when said first means is energized and said third component is de-energized and having a first input that is coupled to an output of said first component for enabling and disabling said fifth "and" circuit when said first component is energized and de-energized respectively, and a second input that is coupled to the output of said third component for enabling and disabling said fifth "and" circuit when said third component is de-energized and energized respectively; said one starting circuit conditioning circuit comprises sixth "and" circuit means with an output that is coupled to said second component for maintaining the energized condition of said second component, said sixth "and" circuit means being responsive when said second component is energized and said third component is de-energized and having a first input that is coupled to the output of said third component for enabling and disabling said sixth "and" circuit when said third component is de-energized and energized respectively, and a second input that is coupled to the output of said third component for enabling and disabling said fifth "and" circuit when said third component is de-energized and energized, respectively; and said one stopping circuit conditioning circuit comprises seventh "and" circuit means with an output that is coupled to said fourth component for maintaining the energized condition of said fourth component, said seventh "and" circuit means being responsive when said fourth component is energized and the fourth component of the stopping circuit conditioning circuit of the motor next succeeding said one motor in said cyclic order is de-energized and having a first input that is coupled to an output of the fourth component of said one stopping circuit conditioning circuit for enabling and disabling said seventh "and" circuit when the fourth component of said one stopping circuit conditioning circuit is energized and de-energized, and a second input that is coupled to an output of the fourth component of the stopping circuit conditioning circuit associated with said next succeeding motor for enabling and disabling said seventh "and" circuit when the fourth component of the stopping circuit conditioning circuit associated with said next succeeding motor is respectively de-energized and energized.

* * * * *

UNITED STATES PATENT AND TRADEMARK OFFICE
CERTIFICATE OF CORRECTION

PATENT NO. : 4341983
DATED : July 27, 1982
INVENTOR(S) : Mayo Gottliebson

It is certified that error appears in the above—identified patent and that said Letters Patent are hereby corrected as shown below:

Column 40, Line 7, delete "respect" and substitute -- respective --;

Column 40, Line 52, delete "more" and substitute -- motor --;

Signed and Sealed this

Twenth-eighth Day of September 1982

[SEAL]

Attest:

GERALD J. MOSSINGHOFF

Attesting Officer  Commissioner of Patents and Trademarks